(12) United States Patent
Yamaguchi et al.

(10) Patent No.: US 10,171,252 B2
(45) Date of Patent: Jan. 1, 2019

(54) DATA DETERMINATION APPARATUS, DATA DETERMINATION METHOD, AND COMPUTER READABLE MEDIUM

(71) Applicant: MITSUBISHI ELECTRIC CORPORATION, Tokyo (JP)

(72) Inventors: Teruyoshi Yamaguchi, Tokyo (JP); Koichi Shimizu, Tokyo (JP); Nobuhiro Kobayashi, Tokyo (JP); Tsunato Nakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/510,981

(22) PCT Filed: Dec. 22, 2015

(86) PCT No.: PCT/JP2015/085742
§ 371 (c)(1),
(2) Date: Mar. 13, 2017

(87) PCT Pub. No.: WO2016/114077
PCT Pub. Date: Jul. 21, 2016

(65) Prior Publication Data
US 2017/0279622 A1    Sep. 28, 2017

(30) Foreign Application Priority Data
Jan. 16, 2015    (WO) ............... PCT/JP2015/051108

(51) Int. Cl.
*G06F 15/173*  (2006.01)
*H04L 9/36*  (2006.01)
(Continued)

(52) U.S. Cl.
CPC ............... *H04L 9/36* (2013.01); *G06F 21/55* (2013.01); *G06F 21/554* (2013.01);
(Continued)

(58) Field of Classification Search
CPC ... G06F 21/554; H04L 29/14; H04L 63/0227; H04L 63/0254; H04L 63/1425; H04L 63/145; H04L 63/1458
See application file for complete search history.

(56) References Cited

U.S. PATENT DOCUMENTS 6,941,467 B2   9/2005   Judge et al.
7,089,590 B2   8/2006   Judge et al.
(Continued)

FOREIGN PATENT DOCUMENTS

CN   101442519 A   5/2009
JP   2001-34553 A   2/2001
(Continued)

OTHER PUBLICATIONS

Carcano et al., "A Multidimensional Critical State Analysis for Detecting Intrusions in SCADA Systems," IEEE Transactions on Industrial Informatics, vol. 7, No. 2, New York, NY, USA, May 6, 2011 (Date of publication Jan. 10, 2011), XP011321687, pp. 179-186.

(Continued)

*Primary Examiner* — Shean Tokuta
(74) *Attorney, Agent, or Firm* — Birch, Stewart, Kolasch & Birch, LLP

(57) ABSTRACT

A data determination apparatus of the present invention includes a state transition model storage unit to store a state transition model representing a state transition, a state management unit to hold an operating state of an own apparatus based on the state transition model, a communication permission list storage unit to store, as a communication permission list, communication permitted data whose communications are permitted in respective operating states, a communication unit to obtain communication determination data, and a determination unit to determine whether or not the communication determination data is communication (Continued)

permitted data whose communication has been permitted in a current operating state, using the current operating state and the communication permission list.

18 Claims, 19 Drawing Sheets

(51) Int. Cl.
  *G06F 21/55* (2013.01)
  *G06F 21/56* (2013.01)
  *H04L 29/06* (2006.01)
(52) U.S. Cl.
  CPC ........ *G06F 21/567* (2013.01); *H04L 63/0227* (2013.01); *H04L 63/0263* (2013.01); *H04L 63/145* (2013.01); *H04L 63/1416* (2013.01)

(56) References Cited

U.S. PATENT DOCUMENTS

| | | |
|---|---|---|
| 7,096,498 B2 | 8/2006 | Judge |
| 7,124,438 B2 | 10/2006 | Judge et al. |
| 7,213,260 B2 | 5/2007 | Judge |
| 7,225,466 B2 | 5/2007 | Judge |
| 7,458,098 B2 | 11/2008 | Judge et al. |
| 7,519,994 B2 | 4/2009 | Judge et al. |
| 7,570,586 B1* | 8/2009 | Albert ............... H04L 29/06 370/229 |
| 7,693,947 B2 | 4/2010 | Judge et al. |
| 7,694,128 B2 | 4/2010 | Judge et al. |
| 7,779,156 B2 | 8/2010 | Alperovitch et al. |
| 7,779,466 B2 | 8/2010 | Judge et al. |
| 7,870,203 B2 | 1/2011 | Judge et al. |
| 7,903,549 B2 | 3/2011 | Judge et al. |
| 7,937,480 B2 | 5/2011 | Alperovitch et al. |
| 8,042,149 B2 | 10/2011 | Judge |
| 8,042,181 B2 | 10/2011 | Judge |
| 8,069,481 B2 | 11/2011 | Judge |
| 8,074,277 B2* | 12/2011 | Freund ............... H04L 63/1416 713/154 |
| 8,079,083 B1* | 12/2011 | Bennett ............... H04L 63/1416 726/23 |
| 8,132,250 B2 | 3/2012 | Judge et al. |
| 8,179,798 B2 | 5/2012 | Alperovitch et al. |
| 8,331,910 B2 | 12/2012 | Maeda |
| 8,363,549 B1* | 1/2013 | Zhu ............... H04L 63/0218 370/225 |
| 8,549,611 B2 | 10/2013 | Judge et al. |
| 8,555,089 B2 | 10/2013 | Ito et al. |
| 8,561,167 B2 | 10/2013 | Alperovitch et al. |
| 8,572,680 B2 | 10/2013 | Osterweil et al. |
| 8,577,817 B1* | 11/2013 | Keralapura ............ G06N 99/005 370/235 |
| 8,578,051 B2 | 11/2013 | Alperovitch et al. |
| 8,578,480 B2 | 11/2013 | Judge et al. |
| 8,584,237 B2 | 11/2013 | Baba et al. |
| 8,631,495 B2 | 1/2014 | Judge |
| 8,635,690 B2 | 1/2014 | Alperovitch et al. |
| 8,726,085 B2 | 5/2014 | Akiyama et al. |
| 8,813,221 B1* | 8/2014 | Dubrovsky ......... H04L 63/1408 726/22 |
| 8,925,101 B2 | 12/2014 | Bhargava et al. |
| 8,935,744 B2 | 1/2015 | Osterweil et al. |
| 8,938,800 B2 | 1/2015 | Bhargava et al. |
| 9,064,110 B2 | 6/2015 | Akiyama et al. |
| 9,467,470 B2 | 10/2016 | Bhargava et al. |
| 2003/0172166 A1 | 9/2003 | Judge et al. |
| 2003/0172167 A1 | 9/2003 | Judge et al. |
| 2003/0172291 A1 | 9/2003 | Judge et al. |
| 2003/0172292 A1 | 9/2003 | Judge |
| 2003/0172294 A1 | 9/2003 | Judge |
| 2003/0172301 A1 | 9/2003 | Judge et al. |
| 2003/0172302 A1 | 9/2003 | Judge et al. |
| 2005/0033527 A1* | 2/2005 | Wada ............... G01D 3/08 702/35 |
| 2005/0152286 A1* | 7/2005 | Betts ............... H04L 45/02 370/255 |
| 2006/0015563 A1 | 1/2006 | Judge et al. |
| 2006/0015942 A1 | 1/2006 | Judge et al. |
| 2006/0021055 A1 | 1/2006 | Judge et al. |
| 2006/0174341 A1 | 8/2006 | Judge |
| 2006/0248156 A1 | 11/2006 | Judge et al. |
| 2006/0251068 A1 | 11/2006 | Judge et al. |
| 2006/0253447 A1 | 11/2006 | Judge |
| 2006/0265747 A1 | 11/2006 | Judge |
| 2006/0267802 A1 | 11/2006 | Judge et al. |
| 2007/0027992 A1 | 2/2007 | Judge et al. |
| 2007/0130350 A1 | 6/2007 | Alperovitch et al. |
| 2007/0130351 A1 | 6/2007 | Alperovitch et al. |
| 2007/0171030 A1* | 7/2007 | Kobayashi .......... B60R 25/1004 340/426.1 |
| 2007/0195753 A1 | 8/2007 | Judge et al. |
| 2007/0195779 A1 | 8/2007 | Judge et al. |
| 2007/0300286 A1 | 12/2007 | Judge |
| 2008/0175226 A1 | 7/2008 | Alperovitch et al. |
| 2008/0178259 A1 | 7/2008 | Alperovitch et al. |
| 2008/0184366 A1 | 7/2008 | Alperovitch et al. |
| 2010/0174919 A1 | 7/2010 | Ito et al. |
| 2010/0229234 A1* | 9/2010 | Rouse ............... H04L 63/0218 726/11 |
| 2010/0306846 A1 | 12/2010 | Alperovitch et al. |
| 2011/0167030 A1* | 7/2011 | Bremler-Barr ......... G06N 5/003 706/48 |
| 2011/0173490 A1* | 7/2011 | Narayanaswamy ............ H04L 63/1408 714/4.11 |
| 2011/0190957 A1* | 8/2011 | Iwagami ............... G06F 1/28 700/293 |
| 2011/0238855 A1* | 9/2011 | Korsunsky ............ G06F 21/55 709/231 |
| 2012/0005755 A1 | 1/2012 | Kitazawa et al. |
| 2012/0030731 A1 | 2/2012 | Bhargava et al. |
| 2012/0030750 A1 | 2/2012 | Bhargava et al. |
| 2012/0030761 A1 | 2/2012 | Baba et al. |
| 2012/0076114 A1* | 3/2012 | Oguchi ............... H04W 76/19 370/336 |
| 2012/0100834 A1 | 4/2012 | Maeda |
| 2012/0102563 A1* | 4/2012 | Kim ............... H04L 43/12 726/13 |
| 2012/0136629 A1* | 5/2012 | Tamaki ............... G05B 23/0254 702/183 |
| 2012/0192278 A1* | 7/2012 | Kito ............... G06F 21/52 726/24 |
| 2012/0204265 A1 | 8/2012 | Judge |
| 2012/0210158 A1 | 8/2012 | Akiyama et al. |
| 2012/0240185 A1* | 9/2012 | Kapoor ............... H04L 63/1425 726/1 |
| 2012/0271890 A1 | 10/2012 | Judge et al. |
| 2012/0290879 A1* | 11/2012 | Shibuya ............... G05B 23/021 714/26 |
| 2013/0042299 A1 | 2/2013 | Osterweil et al. |
| 2013/0044003 A1* | 2/2013 | Eguro ............... G06F 21/554 340/653 |
| 2013/0152198 A1 | 6/2013 | Akiyama et al. |
| 2013/0198803 A1 | 8/2013 | Osterweil et al. |
| 2013/0227689 A1* | 8/2013 | Pietrowicz ............ G01R 1/20 726/23 |
| 2013/0305369 A1* | 11/2013 | Karta ............... H04L 63/1416 726/23 |
| 2013/0340977 A1* | 12/2013 | Singleton ............... F28D 15/02 165/104.21 |
| 2013/0343390 A1* | 12/2013 | Moriarty ............ H04L 43/0852 370/392 |
| 2014/0026186 A1 | 1/2014 | Osterweil et al. |
| 2014/0065951 A1* | 3/2014 | Ohashi ............... H04W 88/08 455/21 |
| 2014/0090056 A1* | 3/2014 | Manadhata ............ G06F 21/552 726/23 |
| 2015/0180884 A1 | 6/2015 | Bhargava et al. |

(56) References Cited

U.S. PATENT DOCUMENTS

| | | | |
|---|---|---|---|
| 2015/0200968 A1 | 7/2015 | Bhargava et al. | |
| 2016/0085237 A1* | 3/2016 | Yunoki | H04L 29/14 726/22 |
| 2016/0099864 A1* | 4/2016 | Akiya | H04L 45/28 370/216 |

FOREIGN PATENT DOCUMENTS

| | | |
|---|---|---|
| JP | 2004-336130 A | 11/2004 |
| JP | 2005-275988 A | 10/2005 |
| JP | 2007-179206 A | 7/2007 |
| JP | 2009-122923 A | 6/2009 |
| JP | 2010-9185 A | 1/2010 |
| JP | 2010-9186 A | 1/2010 |
| JP | 2010-182296 A | 8/2010 |
| JP | 2011-70297 A | 4/2011 |
| JP | 4688420 B2 | 5/2011 |
| JP | 2012-14320 A | 1/2012 |
| JP | 2012-34273 A | 2/2012 |
| JP | 2012-34334 A | 2/2012 |
| JP | 2012-168686 A | 9/2012 |
| JP | 2013-532869 A | 8/2013 |
| JP | 2013-539573 A | 10/2013 |
| JP | 2014-179993 A | 9/2014 |
| WO | WO 2011-001526 A | 1/2011 |

OTHER PUBLICATIONS

Fovino et al., "Modbus/DNP3 State-based Intrusion Detection System", 2010 24th IEEE International Conference on Advanced Information Networking and Applications, 2010, pp. 729-736.

Yang et al., "Multiattribute SCADA-Specific Intrusion Detection System for Power Networks", IEEE Transactions on Power Delivery, 2014, pp. 1092-1102.

Communication pursuant to Article 94(3) EPC dated Jun. 12, 2018 in corresponding European Application No. 15878028.8.

\* cited by examiner

Fig. 4

114 : COMMUNICATION PERMISSION LIST

| OPERATING STATE | COMMUNICATION DATA No. | TRANSMISSION SOURCE ADDRESS | COMMAND TYPE | DATA SIZE UPPER LIMIT | DATA SETTING RANGE |
|---|---|---|---|---|---|
| NW CONSTRUCTION | 1 | 192.168.0.10 | OBTAIN NW SETTING DATA | 100 | — |
| | 2 | 192.168.0.10 | COMPLETE NW SETTING | 0 | — |
| | 3 | 192.168.0.13 | OBTAIN STATE DATA | 0 | — |
| OPERATION A | 7 | 192.168.0.13 | SET OPERATION DATA | 1 | 0~100 |
| | 4 | 192.168.0.15 | TRANSMIT PARAMETER FILE | 1,000 | — |
| OPERATION B | 5 | 192.168.0.15 | SET PARAMETER FILE | 0 | — |
| OPERATION C | 6 | 192.168.0.15 | VERIFY | 0 | — |
| | 8 | 192.168.0.17 | UPDATE PROGRAM | 100,000 | — |
| MAINTENANCE | 9 | 192.168.0.17 | VERIFY | 0 | — |
| | 10 | 192.168.0.17 | COMPLETE MAINTENANCE | 0 | — |
| WAIT | none | — | — | — | — |
| ABNORMAL | none | — | — | — | — |

119 : COMMUNICATION PERMITTED DATA

Fig. 10

COMMUNICATION PERMISSION LIST GENERATED BY STATE TRANSITION MODEL

| OPERATING STATE | PERMITTED COMMUNICATION | TRANSITION CONDITION | TRANSITION DESTINATION |
|---|---|---|---|
| 1-1 | 1, 2 | COMMUNICATION DATA 2 | 1-2 |
| 1-2 | 3, 4, 5 | COMMUNICATION DATA 5 : TIMER-ON | WAIT |
| 2 | 3, 4 | HUMAN OPERATION 1 | 3-1 |
| 3-1 | 6, 7, 8 | COMMUNICATION DATA 8 | 3-2 |
| 3-2 | 3, 4, 5 | — | 1-1 |
| WAIT | None | TIMER-OFF | 2 |

Fig. 11

COMMUNICATION PERMISSION LIST AFTER AGGREGATION

| OPERATING STATE | PERMITTED COMMUNICATION | TRANSITION CONDITION | TRANSITION DESTINATION |
|---|---|---|---|
| 1-1 | 1, 2 | COMMUNICATION DATA 2 | 1-2 |
| 1-2 | 3, 4, 5 | COMMUNICATION DATA 5 : TIMER-ON HUMAN OPERATION 1 | WAIT 3-1 |
| 3-1 | 6, 7, 8 | COMMUNICATION DATA 8 | 1-2 |
| WAIT | None | TIMER-OFF | 1-2 |

Fig. 16

114e : COMMUNICATION PERMISSION LIST

| OPERATING STATE | RULE NUMBER | RECEPTION DATA CONDITION ||||| 1921 TIMER PERMITTED VALUE | 1922 FLAG PERMITTED VALUE | 18 ACTION ||
|---|---|---|---|---|---|---|---|---|---|
| | | TRANSMISSION SOURCE ADDRESS | COMMAND TYPE | DATA SIZE UPPER LIMIT | DATA SETTING RANGE | | | TIMER SET VALUE | FLAG SET VALUE |
| NW CONSTRUCTION | 1 | 192.168.0.10 | OBTAIN NW SETTING DATA | 100 | — | — | — | — | — |
| | 2 | 192.168.0.10 | COMPLETE NW SETTING | 0 | — | — | — | — | — |
| | 3a | 192.168.0.13 | OBTAIN STATE DATA | 0 | — | 0 | 0 | b+d | 1 |
| | 3b | 192.168.0.13 | OBTAIN STATE DATA | 0 | — | 0<T1<2*d | 1 | b+T1 | — |
| | 3c | 192.168.0.13 | FINISH OBTAINING STATE DATA | 0 | — | 0<T1<2*d | 1 | 0 | 0 |
| OPERATION A | 7 | 192.168.0.13 | SET OPERATION DATA | 1 | 0~100 | — | — | — | — |
| | 4 | 192.168.0.15 | TRANSMIT PARAMETER FILE | 1,000 | — | — | — | — | — |
| OPERATION B | 5 | 192.168.0.15 | SET PARAMETER FILE | 0 | — | — | — | 100 | — |
| OPERATION C | 6 | 192.168.0.15 | VERIFY | 0 | — | — | — | — | — |
| MAINTENANCE | 8 | 192.168.0.17 | UPDATE PROGRAM | 100,000 | — | — | — | — | — |
| | 9 | 192.168.0.17 | VERIFY | 0 | — | — | — | — | — |
| | 10 | 192.168.0.17 | COMPLETE MAINTENANCE | 0 | — | — | — | — | — |
| ABNORMAL | — | — | — | — | — | — | — | — | — |

119e : COMMUNICATION PERMITTED DATA    192 : PERMISSION CONDITION    193 : PERMISSION PROCESS
14 : COMMUNICATION PERMISSION RULE

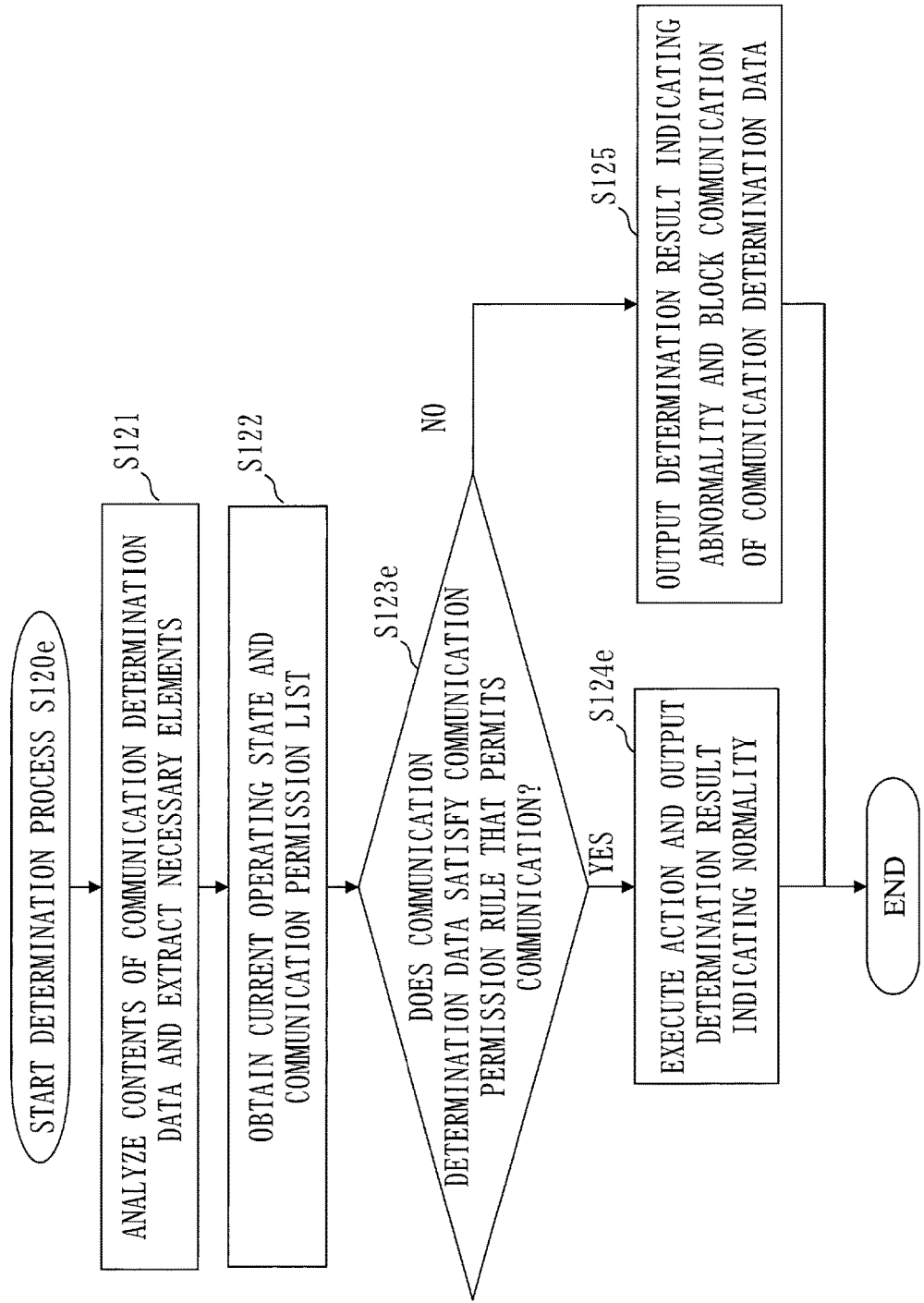

DATA DETERMINATION APPARATUS, DATA DETERMINATION METHOD, AND COMPUTER READABLE MEDIUM

TECHNICAL FIELD

The present invention relates to a data determination apparatus, a data determination method, and a program. More specifically, the invention relates to a data determination apparatus, a data determination method, and a program to detect intrusion of an attack into a network.

BACKGROUND ART

In recent years, the number of cases where an industrial control system is connected to a network has increased in the industrial control system, so that the number of cases where the system becomes a target of a cyber attack has increased. The following methods have been adopted in the industrial control system in order to detect intrusion into the network by the cyber attack.

A conventional intrusion detection system defines a communication where a pair of a transmission destination address and a transmission source address, a protocol, and so on are permitted, using that network communication in the industrial control system is static. Then, the intrusion detection system sets a communication other than the permitted communication to be abnormal, thereby taking a countermeasure of a white-list type to detect intrusion of an unknown attack as well (see Patent Documents 1 and 2).

There has also been proposed a method of defining a communication sequence to be permitted and managing a communication state of being unconnected, being under communication, being subject to an abnormality process or the like in each communication sequence (see Patent Literature 2).

There has also been proposed a method of defining an application whose communication is to be permitted, thereby detecting network intrusion by execution of an unauthorized program (see Patent Literature 3).

CITATION LIST

Patent Literature

Patent Literature 1: JP 4688420
Patent Literature 2: JP 2001-034553A
Patent Literature 3: JP 2013-532869A

SUMMARY OF INVENTION

Technical Problem

In recent years, a sophisticated attack represented by Stuxnet and targeting an industrial control system has come to be conducted. The Stuxnet takes over a server whose communication has been permitted, and then causes an attack communication to be mixed with a communication defined to be normal. Consequently, there is a problem that the attack communication evades the countermeasure of the white-list type in each of Patent Literatures 1 and 2.

In the technology in Patent Literature 2, communication states of a transmission source and a transmission destination are monitored, it is determined whether the communication states are in accordance with the communication sequence prescribed in advance, and access control is performed according to a result of the determination. However, there is a problem that, in this case, by performing communication in accordance with the communication sequence through the server taken over, communication of attack data for unauthorized rewriting of a program or the like as well becomes possible.

In the technology in Patent Literature 3, association between each application program and a communication is made on each local host. When a communication is generated, it is determined whether the application program that performs this communication is the one whose communication is permitted, and this communication is thereby blocked. In the technology in this Patent Literature 3, however, when vulnerability in the application program whose communication has been permitted is attacked, the communication cannot be blocked.

An object of the present invention is to provide a data determination apparatus capable of detecting intrusion of even an attack whereby a server whose communication has been permitted is taken over and an attack communication is mixed with a communication defined to be normal.

Solution to Problem

A data determination apparatus according to the present invention may include:

a state transition model storage unit to store a state transition model representing a state transition between respective operating states of a plurality of operating states;

a state management unit to hold an operating state of the data determination apparatus based on the state transition model;

a communication permission list storage unit to store, as a communication permission list, communication permitted data whose communications are permitted in the respective operating states of the plurality of operating states;

a communication unit to obtain communication data as communication determination data; and a determination unit to obtain the communication determination data obtained by the communication unit, obtain the operating state of the data determination apparatus held by the state management unit as a current operating state, and determine whether or not the communication determination data is communication permitted data whose communication has been permitted in the current operating state, using the current operating state and the communication permission list.

Advantageous Effects of Invention

According to the data determination apparatus of the present invention, the communication permitted data whose communications are permitted in the respective operating states included in the state transition model is set as the communication permission list, and the determination unit determines whether or not the communication determination data is the communication permitted data whose communication has been permitted in the current operating state, using the current operating state and the communication permission list. Thus, it is possible to detect intrusion of even an attack whereby a server whose communication has been permitted is taken over and an attack communication is mixed with a communication defined to be normal.

BRIEF DESCRIPTION OF DRAWINGS

FIG. 4 is a configuration table of a communication permission list according to the first embodiment.

FIG. 10 is a table illustrating a communication permission list generated by a state transition model.

FIG. 11 is a table illustrating a communication permission list after aggregation.

FIG. 16 is a configuration diagram of a communication permission list according to the fourth embodiment.

FIG. 19 is a flow diagram illustrating a determination process by a determination unit according to the fourth embodiment.

DESCRIPTION OF EMBODIMENTS

Figure 1:
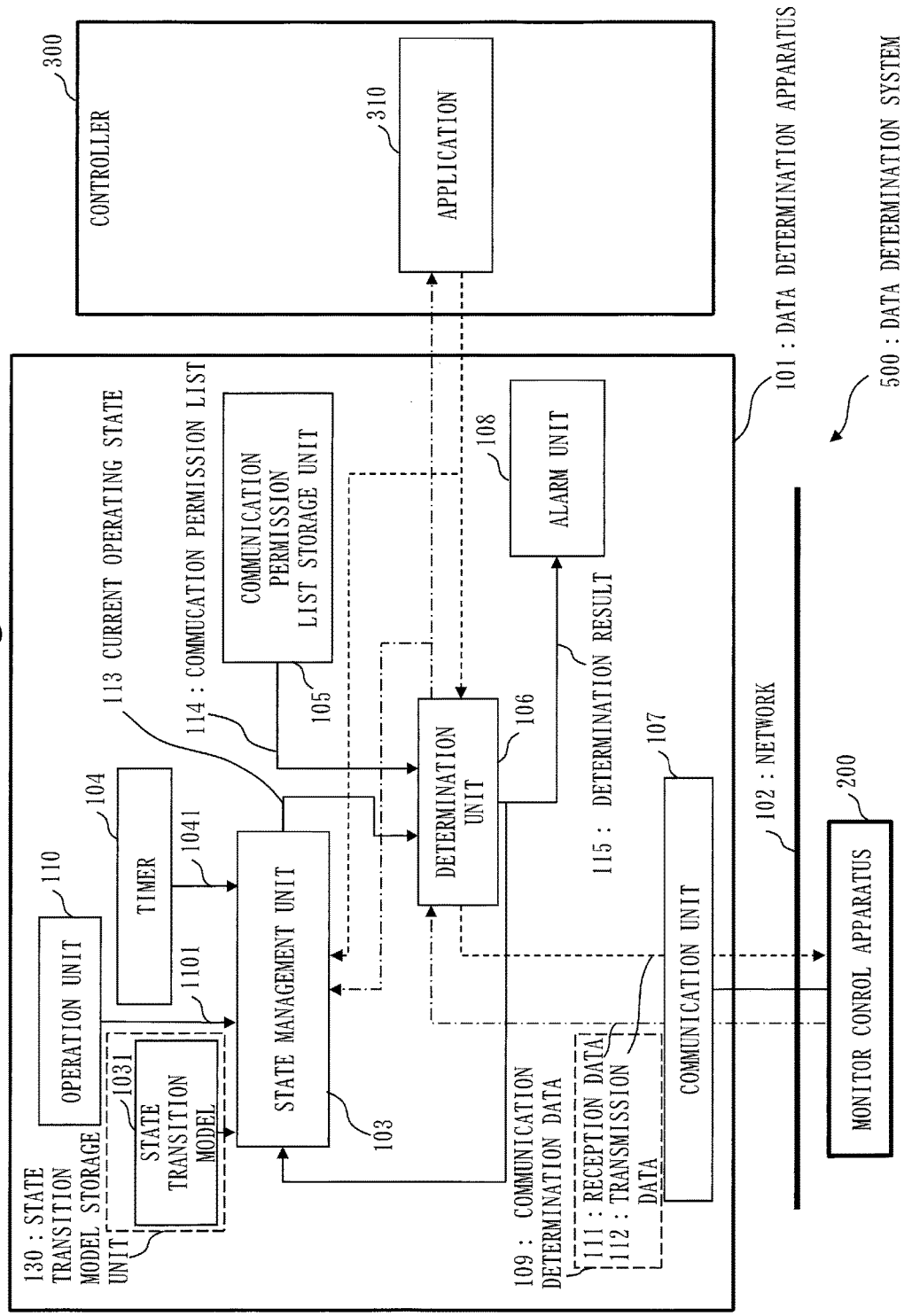
FIG. 1 is a block configuration diagram of a data determination apparatus according to a first embodiment.

First Embodiment.
*Description of Configuration*
A block configuration of a data determination apparatus 101 according to this embodiment will be described, using FIG. 1. Herein, as illustrated in FIG. 1, a system including the data determination apparatus 101, a monitor control apparatus 200, and a controller 300 is referred to as a data determination system 500.

The data determination apparatus 101 is connected to a network 102, and mediates communication data to be communicated between the monitor control apparatus 200 and the controller 300 and makes determination about the communication data. The data determination apparatus 101 is an intrusion detection apparatus or an intrusion detection system to detect an attack whereby the network 102 is intruded.

The controller 300 is included in an industrial control system or the like, for example. The controller 300 includes an application 310. The application 310 transmits transmission data 112 to the data determination apparatus 101. The application 310 receives reception data 111 from the monitor control apparatus 200. Herein, the reception data 111 and the transmission data 112 which are communicated and about which the determination is made by the data determination apparatus 101 are also referred to as communication determination data 109.

The monitor control apparatus 200 is a server to monitor and control the industrial control system or the like, for example.

The data determination apparatus 101 mediates the reception data 111 received from the monitor control apparatus 200 via the network 102 to the controller 300. The data determination apparatus 101 mediates the transmission data 112 transmitted by the controller 300 to the monitor control apparatus 200 via the network 102.

The data determination apparatus 101 performs a data determination process to detect intrusion of the attack during the course of mediating each of the reception data 111 and the transmission data 112.

The data determination apparatus 101 includes a state management unit 103, a timer 104, a communication permission list storage unit 105, a determination unit 106, a communication unit 107, an alarm unit 108, an operation unit 110, and a state transition model storage unit 130.

The state transition model storage unit 130 stores a state transition model 1031 that represents a state transition between respective operating states of a plurality of operating states. The state transition model storage unit 130 stores the state transition model 1031 to transition between the respective operating states of the plurality of operating states according to obtained information 1033 obtained by an own apparatus. The own apparatus is the data determination apparatus 101 itself.

The obtained information 1033 is an element for transitioning one of the states of the data determination apparatus 101. The obtained information 1033 includes the communication data obtained by the communication, an operation signal 1101 indicating receipt of an operation on the own apparatus, and a timer signal 1041 to be output from the timer 104.

The state management unit 103 holds the operating state of the own apparatus or the data determination apparatus 101, based on the state transition model 1031. The communication permission list storage unit 105 stores, as a communication permission list 114, communication permitted data 119 whose communications are permitted in the respective operating states of the plurality of operating states.

The communication unit 107 obtains the communication data as the communication determination data 109.

The determination unit 106 obtains the communication determination data 109 obtained by the communication unit 107 and obtains an operating state 1032 of the own apparatus held by the state management unit 103, as a current operating state 113. The determination unit 106 determines whether or not the communication determination data 109 is communication permitted data 119 whose communication has been permitted in the current operating state 113, using the current operating state 113 and the communication permission list 114.

The communication unit 107 performs connection to the monitor control apparatus 200 via the network 102. The communication unit 107 receives the reception data 111 from the monitor control apparatus 200 via the network 102 and outputs the reception data 111 received to the determination unit 106. The communication unit 107 transmits the transmission data 112 received to the monitor control apparatus 200 via the network 102. The communication unit 107 is a network input/output unit.

The state management unit 103 manages each operating state of the data determination apparatus 101, using the state transition model 1031. The state transition model 1031 is set in advance and is stored in a storage region of the data determination apparatus 101.

The operation unit 110 is a button, a touch panel, or the like to be operated by a human. The operation unit 110 outputs the operation signal 1101 indicating receipt of the operation on the own apparatus.

The timer 104 measures a period of time during which the operating state of the own apparatus continues. That is, the timer 104 measures the period of time in a time constraint when there is the time constraint in the communication.

The communication permission list storage unit 105 is a storage region to store the communication permission list 114.

The determination unit 106 obtains the reception data 111 or the transmission data 112, the current operating state 113 output by the state management unit 103, and the communication permission list 114 stored in the communication permission list storage unit 105. The determination unit 106 compares the reception data 11 or the transmission data 112 obtained, with respect to the current operating state 113 and the communication permission list 114, determines whether or not the reception data 111 or the transmission data 112 is permitted, and output a determination result 115.

If the determination unit 106 determines that the communication determination data 109 is not the communication permitted data 119, the determination unit 106 blocks the communication. That is, if the determination result 115 indicates abnormality, the determination unit 106 blocks the communication.

The alarm unit 108 outputs an alarm indicating detection of the abnormality if it has been determined by the determination unit 106 that the communication determination data 109 is not the communication permitted data 119. That is, the alarm unit 108 issues the alarm if the determination result 115 indicates the abnormality. The alarm to be issued by the alarm unit 108 may be a visual one such as a lamp, or may be issued to a different server via the network.

The state management unit 103 transitions the operating state 1032 of the own apparatus, based on the state transition model 1031 if it has been determined by the determination unit 106 that the communication determination data 109 is the communication permitted data 119.

If it has been determined by the determination unit 106 that the communication determination data 109 is not the communication permitted data 119, the state management unit 103 causes the operating state 1032 of the own apparatus to an abnormal state.

It may be so arranged that the state management unit 103 only causes the state to transition if the determination result 115 has been determined to be normal.

As mentioned above, the state management unit 103 holds the current operating state 113 of the data determination apparatus 101 that is the own apparatus.

Using FIG. 2, a description will be given about a data determination apparatus 101a to perform a different operation from the data determination apparatus 101 in FIG. 1.

In the data determination apparatus 101 illustrated in FIG. 1, the configuration has been given in which the reception data 111 or the transmission data 112 is communicated after the determination unit 106 has made determination about the communication determination data 109. However, it may be so configured that, as in the data determination apparatus 101a illustrated in FIG. 2, the determination unit 106 captures a communication between the monitor control apparatus 200 and the application 310. If a determination result 115 indicates abnormality in the data determination apparatus 101a in FIG. 2, the determination unit 106 cannot block the communication. However, an attack may be coped with by an alarm issued by the alarm unit 108.

Figure 3:
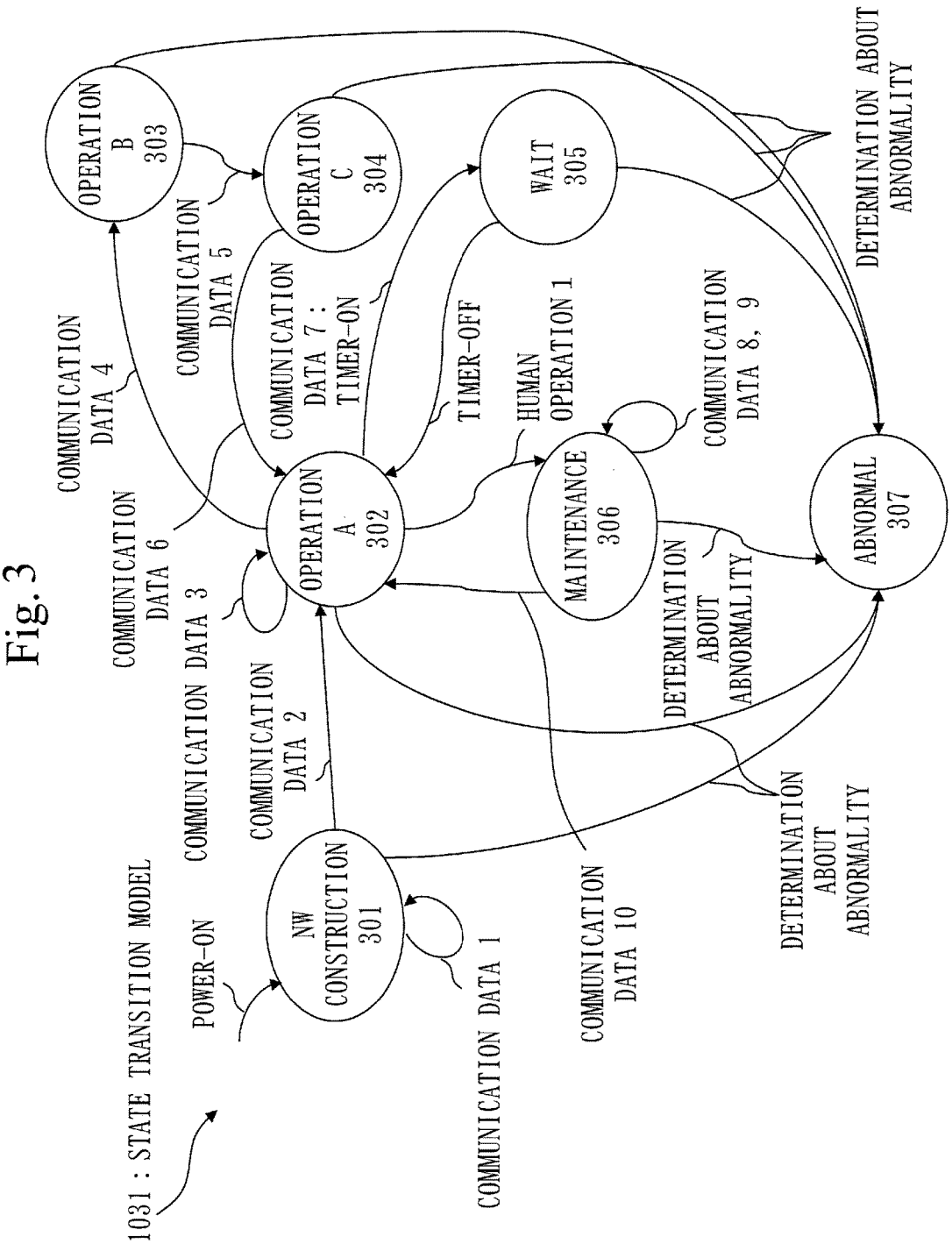
FIG. 3 is a diagram illustrating an example of a state transition model of the data determination apparatus according to the first embodiment.

An example of the state transition model 1031 of the data determination apparatus 101 managed by the state management unit 103 according to this embodiment will be described, using FIG. 3. FIG. 3 indicates the example, and the state transition model 1031 may not necessarily be as illustrated in FIG. 3.

In FIG. 3, states 301 to 307 indicate respective examples of a plurality of operating states 3001. Further, inter-states indicate respective examples of inter-states 3002 between the respective operating states.

In FIG. 3, the data determination apparatus 101 transitions to the NW construction state 301 when powered on, and communicates communication necessary for NW construction. The communication necessary for the NW construction in the data determination apparatus 101 is set to communication data 1. In the following description as well, network construction is described as the NW construction. When the NW construction is completed and communication data 2 is received, a transition to the operating A-state 302 is made in the state transition model 1031.

Assume that there are communications whose order of communication data is prescribed in the state transition model 1031. If there are communications prescribed to receive communication data in the order of communication data 4, 5, and 6, for example, the state transition model 1031 further defines the operating states according to the order of the communications prescribed. In the state transition model 1031 in FIG. 3, it is defined such that a transition to the operating B-state 303 is made if the communication data 4 is communicated, a transition to the operating C-state 304 is made if the communication data 5 is communicated, and then a transition to the operating A-state 302 is made if the communication data 6 is communicated. As mentioned above, it may be so arranged that transition conditions to the respective operating states are assigned to the communication data 4, 5, and 6.

If there is communication data 7 with a time constraint in the operating A-state 302, the timer may be turned on, and then a transition to a wait state 305 may be made. If the timer is turned off, a return to the operating A-state 302 may be made. The timer signal 1041 is a signal indicating that the timer is turned on or off.

Further, a transition to a maintenance state 306 may be made by a human operation 1 to perform communications necessary for maintenance such as communications of communication data 8 and 9. If the maintenance has been completed and communication data 10 has been received, a transition to the operating A-state 302 is made. It may be so arranged that when a state transition using communication data is further made, the transition is made only if a determination result by the determination unit 106 has indicated normality. If the determination result by the determination unit 106 has indicated abnormality in each state, a transition to the abnormal state 307 may be made.

A configuration of the communication permission list 114 according to this embodiment will be described, using FIG. 4.

FIG. 4 illustrates an example of the communication permission list 114 permitted in the respective operating states held by the state management unit 103. The communication permission list 114 in FIG. 4 is an example, and may not necessarily be as illustrated in FIG. 4.

As illustrated in FIG. 4, the communication permission list 114 includes items such as an operating state, a communication data number, a transmission source address, a command type, a data size upper limit, and a data setting range. These items are arbitrary, and a different item may be employed if it is the item capable of identifying communication data.

As illustrated in FIG. 4, when the NW construction is made, only the communication data 1 and 2 are permitted, and communication of the other data is not permitted. No communications are permitted in the wait state.

An example of a hardware configuration of the data determination apparatus 101 according to this embodiment will be described, using FIG. 5.

The data determination apparatus 101 is a computer.

The data determination apparatus 101 includes hardware such as a processor 901, an auxiliary storage device 902, a memory 903, a communication device 904, an input interface 905, and a display interface 906.

The processor 901 is connected to the other hardware via a signal line 910, and controls these other hardware.

The input interface 905 is connected to an input device 907.

The display interface 906 is connected to a display 908.

The processor 901 is an IC (Integrated Circuit) to perform processing.

The processor 901 is a CPU (Central Processing Unit), a DSP (Digital Signal Processor), or a GPU (Graphics Processing Unit), for example.

The auxiliary storage device 902 is a ROM (Read Only Memory), a flash memory, or an HDD (Hard Disk Drive), for example.

The memory 903 is a RAM (Random Access Memory), for example.

The communication device 904 includes a receiver 9041 to receive data and a transmitter 9042 to transmit data.

The communication device 904 is a communication chip or an NIC (Network Interface Card), for example.

The input interface 905 is a port to which a cable 911 of the input device 907 is connected.

The input interface 905 is a USB (Universal Serial Bus) terminal, for example.

The display interface 906 is a port to which a cable 912 of the display 908 is connected.

The display interface 906 is a USB terminal or an HDMI (registered trademark) (High Definition Multimedia Interface) terminal, for example.

The input device 907 is a mouse, a keyboard, or a touch panel, for example.

The display 908 is an LCD (Liquid Crystal Display), for example.

A program to implement functions of the state management unit 103, the determination unit 106, and the alarm unit 108 (in which the state management unit 103, the determination unit 106, and the alarm unit 108 are hereinafter collectively written as a "unit") illustrated in FIG. 1 is stored in the auxiliary storage apparatus 902. The program to implement the functions of the "unit" included in the above-mentioned data determination apparatus 101 is also referred to as a data determination program. The program to implement the functions of the "unit" may be one program or may be constituted from a plurality of programs.

This program is loaded into the memory 903, is read into the processor 901, and is executed by the processor 901.

Further, an OS (Operating System) is also stored in the auxiliary storage apparatus 902.

Then, at least a part of the OS is loaded into the memory 903, and the processor 901 executes the program to implement the functions of the "unit" while executing the OS.

Figure 5:
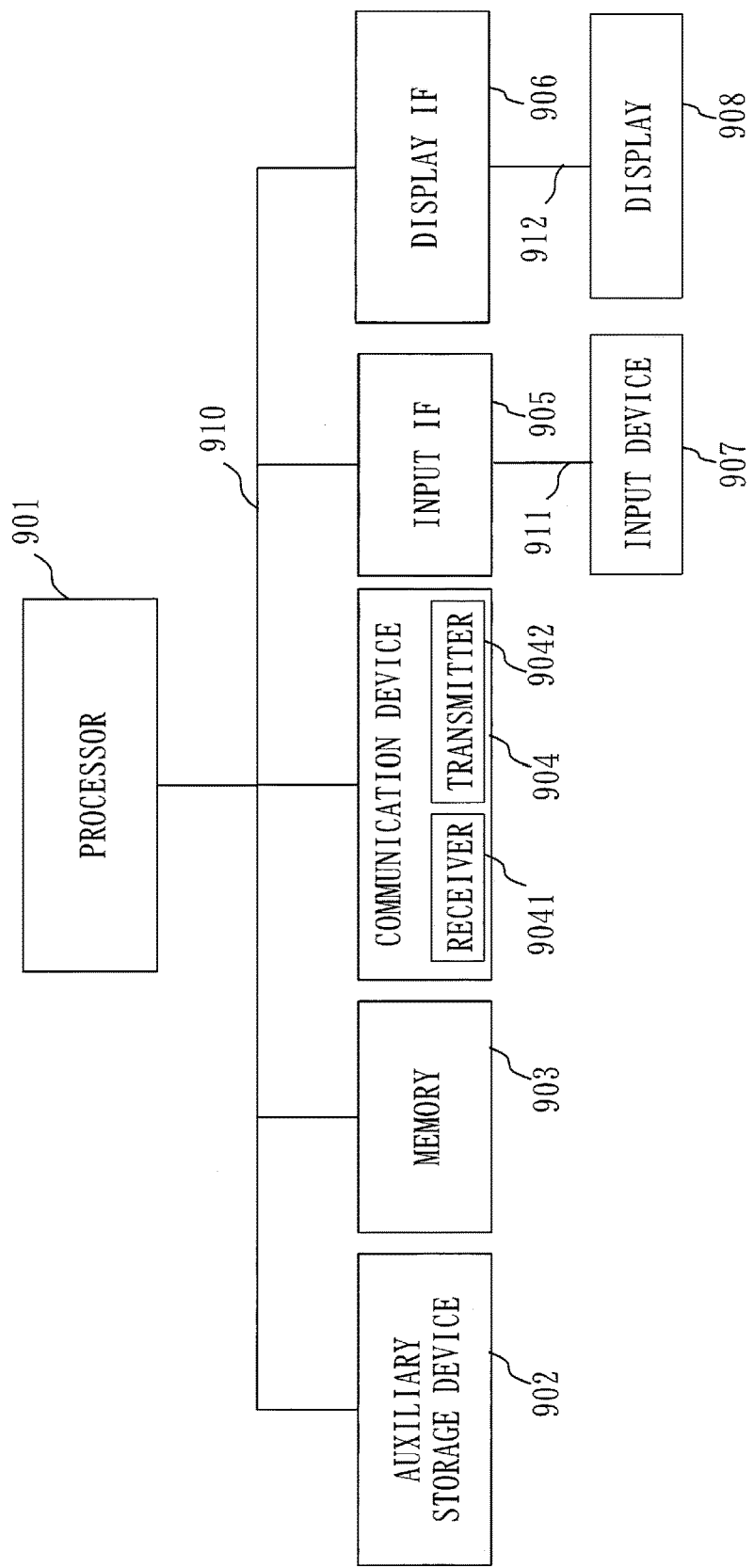
FIG. 5 is a hardware configuration diagram of the data determination apparatus according to the first embodiment.

Though FIG. 5 illustrates one processor 901, the data determination apparatus 101 may include a plurality of the processors 901.

Then, the plurality of the processors 901 may cooperate to execute the program to implement the functions of the "unit".

Information, data, signal values, and variable values indicating results of processes by the "unit" are stored in the memory 903, the auxiliary storage apparatus 902, or a register or a cache memory in the processor 901, as files.

The "unit" may be provided as "circuitry".

Alternatively, the "unit" may be replaced by a "circuit", a "step", a "procedure", or a "process". The "process" may be replaced by the "circuit", the "step", the "procedure", or the "unit".

The "circuit" and the "circuitry" are each a concept including not only the processor 901 but also a processing circuit of a different kind such as a logic IC, a GA (Gate Array), an ASIC (Application Specific Integrated Circuit), or an FPGA (Field-Programmable Gate Array).

A program product is a storage medium, a storage device, or the like in which the program to implement the functions described as the "unit" is stored, and loads a computer readable program regardless of the type of appearance.

*Description of Operations*

Figure 6:
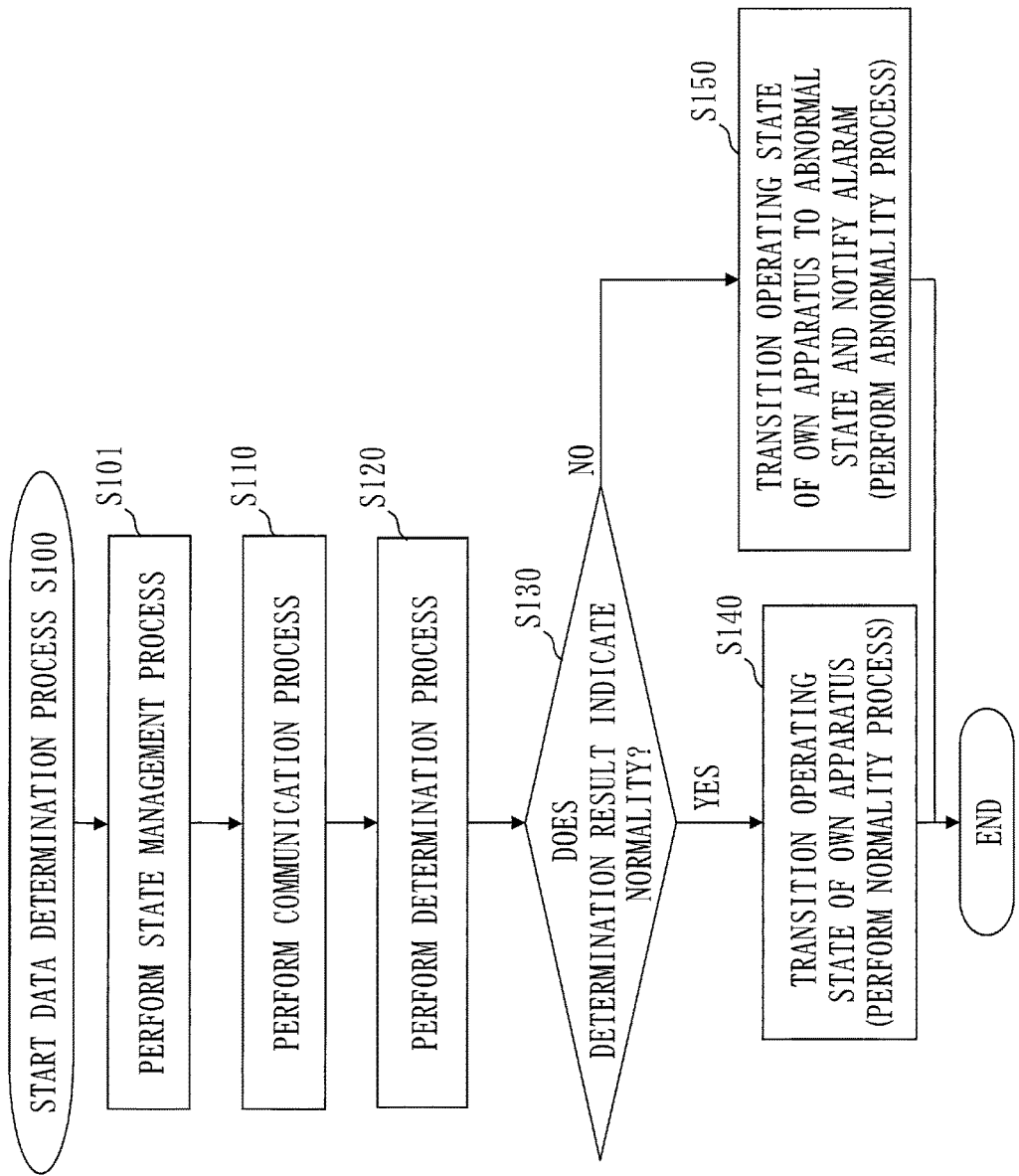
FIG. 6 is a flow diagram of a data determination method or a data determination process of the data determination apparatus according to the first embodiment.

A data determination method or a data determination process S100 of the data determination apparatus 101 according to this embodiment will be described, using FIG. 6.

As described above, the data determination apparatus 101 includes the state transition model storage unit 130 to store the state transition model 1031 and the communication permission list storage unit 105 to store the communication permitted data 119 as the communication permission list 114.

In a state management process S101, the state management unit 103 executes the state management process S101 to hold an operating state 1032 of the own apparatus, based on the state transition model 1031. The state management unit 103 transitions an operating state 1032 of the own apparatus based on the state transition model 1031, thereby holding a latest operating state as the operating state 1032 of the own apparatus.

In a communication process S110, the communication unit 107 executes the communication process S110 to obtain communication data as communication determination data 109. The communication unit 107 obtains reception data 111 or transmission data 112 as the communication determination data 109 that is a determination target.

In a determination process S120, the determination unit 106 obtains the communication determination data 109 obtained in the communication process S110 and obtains the operating state 1032 of the own apparatus held in the state management process S101, as a current operating state 113. Using the current operating state 113 and the communication permission list 114, the determination unit 106 determines whether or not the communication determination data 109 is communication permitted data 119 whose communication has been permitted in the current operating state 113. The determination unit 106 outputs a determination result 115.

If the determination result 115 indicates normality or if the communication determination data 109 is the communication permitted data 119 in S130, the procedure proceeds to a normality process S140.

If the determination result 115 indicates abnormality or if the communication determination data 109 is not the communication permitted data 119 in S130, the procedure proceeds to an abnormality process S150.

In the normality process S140, the state management unit 103 transitions the operating state 1032 of the own apparatus, based on the communication determination data 109 obtained and the state transition model 1031.

In the abnormality process S150, the state management unit 103 transitions the operating state 1032 of the own apparatus to the abnormal state. The alarm unit 108 notifies the alarm.

Figure 7:
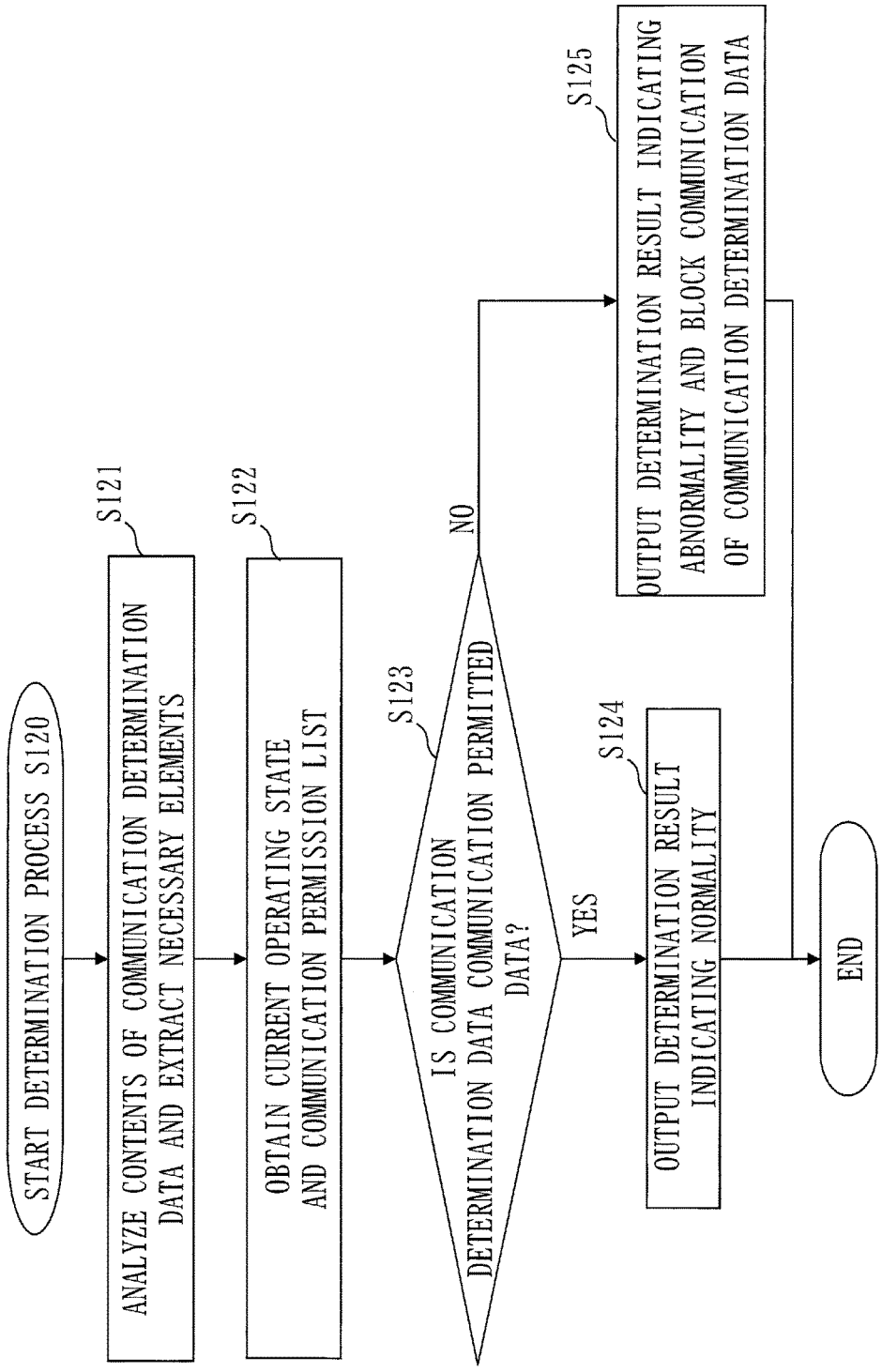
FIG. 7 is a flow diagram illustrating a determination process by a determination unit according to the first embodiment.

Subsequently, the determination process S120 by the determination unit 106 will be described, using FIG. 7.

In S121, the determination unit 106 obtains the communication determination data 109 and analyzes the communication determination data 109 obtained. The determination unit 106 obtains the reception data 111 or the transmission data 112 as the communication determination data 109. The determination unit 106 analyzes contents of the communication determination data 109 to extract elements necessary for the determination. The elements to be extracted are the items described in the communication permission list 114, and are the communication data number, the transmission source address, the transmission destination address, the command type, a response type, and so on.

In S122, the determination unit 106 obtains the current operating state 113 from the state management unit 103. The determination unit 106 obtains the communication permission list 114 from the communication permission list storage unit 105.

In S123, the determination unit 106 determines whether or not the communication determination data 109 is communication data permitted in the current operating state 113 or the communication permitted data 119, based on the current operating state 113 and the communication permission list 114.

If the communication determination data 109 is the communication permitted data 119, the procedure proceeds to S124.

If the communication determination data 109 is not the communication permitted data 119 or the communication determination data 109 is communication not permitted, the procedure proceeds to S125.

In S124, the determination unit 106 outputs the determination result 115 indicating the normality.

In S125, the determination unit 106 outputs the determination result 115 indicating the abnormality and blocks the communication of the communication determination data 109. Alternatively, the determination unit 106 just outputs the determination result 115 indicating the abnormality and does not need to block the communication of the communication determination data 109.

By the above description, the description of the data determination method or the data determination process S100 of the data determination apparatus 101 according to this embodiment is finished.

As mentioned above, the data determination apparatus 101 according to this embodiment has the following components:

(A) the state management unit to manage each operating state, according to the state transition model to transition according to one or more elements of communication data, an external operation, and the timer;

(B) the communication permission list storage unit to store the communication permission list that defines the communication data to be permitted for the respective operating states;

(C) the determination unit to determine whether or not the communication data supplied to the data determination apparatus is normal, using the current operating state output by the state management unit and the communication permission list stored by the communication permission list storage unit; and (D) the alarm unit to issue the alarm, based on a determination result output by the determination unit.

The state management unit manages the operating state, according to the state transition model to transition based on the determination result output by the determination unit. The determination unit blocks the communication data determined to be abnormal.

\*\*\*Description of Advantageous Effects of this Embodiment\*\*\*

In an attack such as the Stuxnet described before for comparison, a server that has been taken over performs program rewriting on a controller. The program rewriting itself is a normal communication and the server that has been taken over is also a server defined to be normal. Thus, the attack such as the Stuxnet cannot be prevented by the countermeasure of the white-list type.

On the other hand, in the data determination apparatus according to this embodiment, a transition of each operating state is made by a human operation or the timer as well as communication data. Accordingly, by making a countermeasure such that program rewriting is accepted only at a time of the maintenance state and the transition to the maintenance state is made just by the human operation, the attack as mentioned above may be detected.

The controller on which the program rewriting has been performed by the Stuxnet highly frequently transmits, to a frequency converter to be controlled, a command to change a frequency, thereby inducing a failure of the apparatus. The data determination apparatus according to this embodiment may take a countermeasure of detecting such a frequency changing command highly frequently transmitted, using the timer.

The above-mentioned measures are an example, and the transition to the maintenance state, for example, may be made by communication data from a dedicated apparatus that is guaranteed not to be in the risk of being taken over.

According to the data determination apparatus in this embodiment, deviation from a correct communication order may also be detected.

Second Embodiment.

In this embodiment, a description will be mainly directed to a difference from the first embodiment.

Same reference signs are assigned to components which are the same as those described in the first embodiment, and a description of these components may be omitted.

In the above-mentioned first embodiment, it has been necessary for a designer to set the state transition model 1031 and the communication permission list 114 in advance. In this embodiment, however, a description will be given about a method of generating a state transition model 1031 and a communication permission list 114 using an obtained information history 151. It is assumed in this embodiment that the obtained information history 151 includes no attack data.

*Description of Configuration*

A block configuration of a data determination apparatus 101b according to this embodiment will be described, using FIG. 8.

Figure 8:
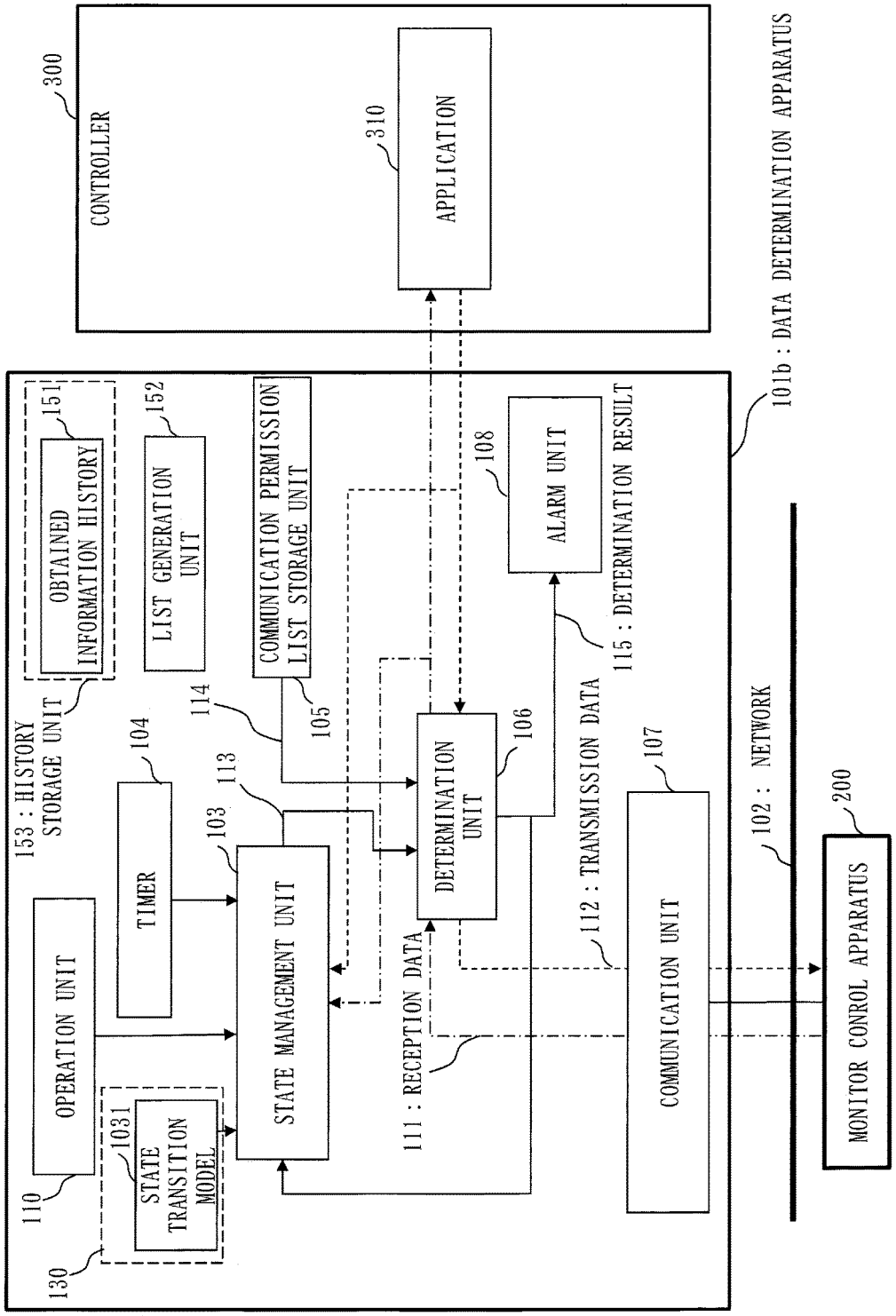
FIG. 8 is a block configuration diagram of a data determination apparatus according to a second embodiment.

As illustrated in FIG. 8, the data determination apparatus 101b according to this embodiment includes, in addition to the configuration in the first embodiment, a history storage unit 153 and a list generation unit 152.

The history storage unit 153 stores a history of obtained information, as the obtained information history 151. The obtained information history 151 is a file that accumulates the obtained information obtained by the data determination apparatus 101b, and is stored in a storage region of the data determination apparatus 101b. The obtained information history 151 is the history of the obtained information obtained by the data determination apparatus 101b, and includes a communication history.

The list generation unit 152 generates the state transition model 1031 and the communication permission list 114, based on the obtained information history 151.

Generation of the state transition model 1031 and the communication permission list 114 may also be performed by a human operation. When the generation is performed by the human operation, there is no need for providing the list generation unit 152.

*Description of Operations*

Figure 9:
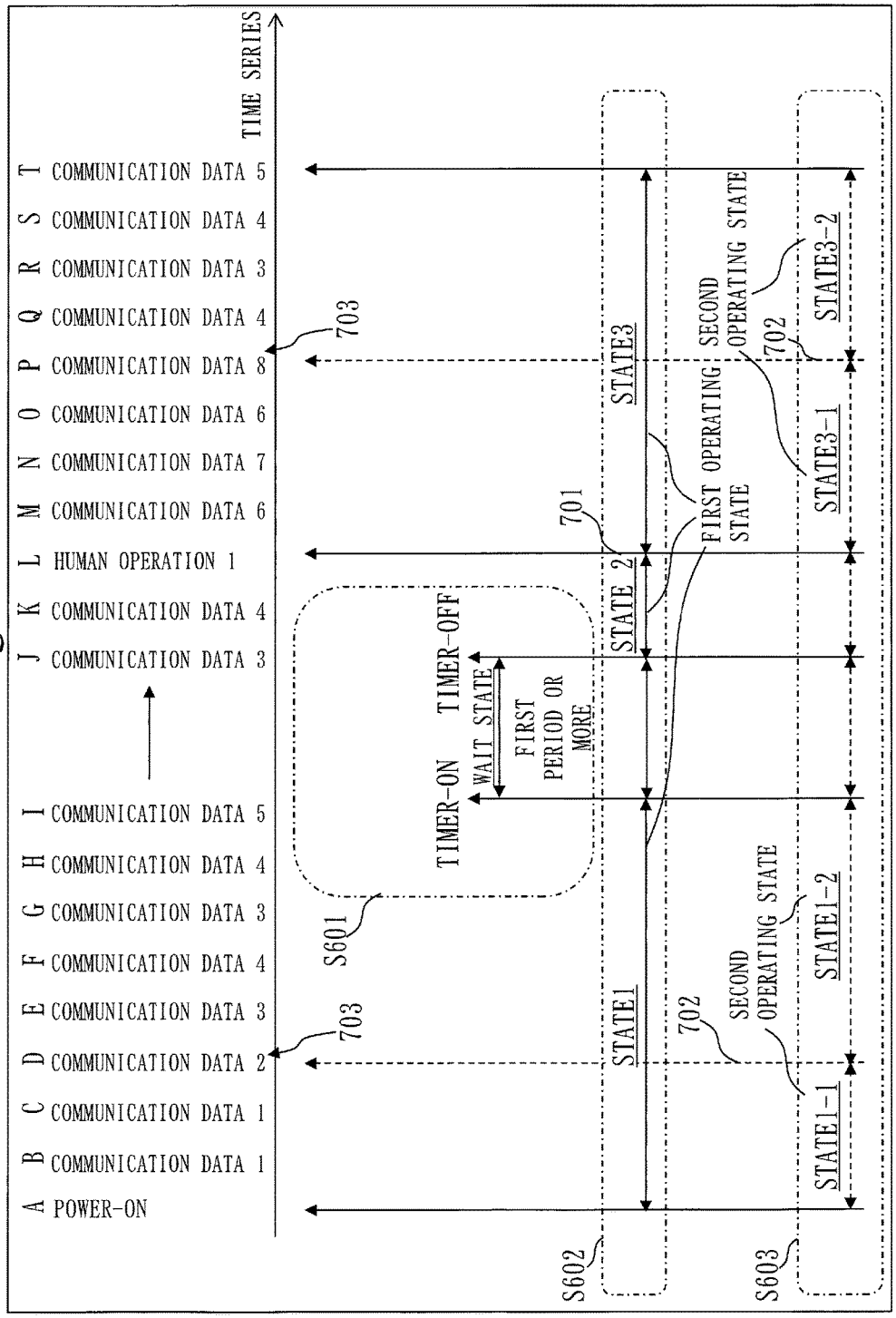
FIG. 9 is a diagram illustrating a procedure for determining an operating state from an obtained information history.

FIG. 9 is a diagram illustrating a procedure for determining each operating state of the data determination apparatus 101b and generating the state transition model 1031 using the obtained information history 151. A description will be herein given, assuming that the list generation unit 152 automatically executes a list generation process.

It is assumed in FIG. 9 that "A powered on" to "T communication data 5" have been obtained from the obtained information history 151.

An overview of a state transition model generation process by the list generation unit 152 will be described, using FIG. 9.

The list generation unit 152 sets a wait state when a period of time elapsed between successive communication data included in the obtained information history 151 is a first period or more.

Subsequently, the list generation unit 152 sets, as a first change point 701a, point of time of having obtained information other than communication data, and sets each of states before and after the first change point 701 as a first operating state.

Then, the list generation unit 152 sets, as a second change point 702, a point of time of having obtained transition communication data 703 whereby an operating state transition has been determined to be made in each first operating state, and sets each of states before and after the second change point 702 as a second operating state. The list generation unit 152 thereby generates the state transition model. Herein, the list generation unit 152 extracts the transition communication data 703, using a clustering method.

An overview of the list generation process by the list generation unit 152 will be described, using FIGS. 10 and 11.

The list generation unit 152 sets, in the communication permission list, communication data communicated in each operating state included in the state transition model, as communication permitted data. The list generation unit 152 aggregates, into one operating state, the operating states in which an inclusion relation is established among the communication permitted data.

Details of the state transition model generation process and the list generation process by the list generation unit 152 will be described, using FIGS. 9 to 11.

In S601, if a period of time elapsed between the communication data is a certain period or more, the list generation unit 152 defines the "wait" state. It is defined that when a transition to the wait state is made, the timer is turned on and a transition to a subsequent operating state is made by turning off the timer.

Then, in S602, the list generation unit 152 sets the first change point 701 of the state if an input other than the communication data has been generated, and sets a state between the first change points 701 to a new first operating state. As illustrated in FIG. 9, a state from the "A powered on" to "I communication data 5: timer on" is defined as a "state 1", and a "state 2" and a "state 3" are defined in a similar way.

Finally, in S603, the list generation unit 152 clusters the communication data between the first change points 701 set in S602 in a time series, and sets a state between clusters as a new second operating state. A Ward's method, a K-means clustering method, or machine leaning may be used for the clustering. When a state change to be caused by the communication data is clear from specifications, the second change point may be defined, based on the specifications. Similarly, when the order of the communication data is defined, each communication data may be set to the second change point.

As illustrated in FIG. 9, in S603, a "state 1-1", a "state 1-2", a "state 3-1", and a "state 3-2" are each defined as the second operating state.

FIG. 10 is the communication permission list generated using the state transition model, and FIG. 11 is a communication permission list after aggregation.

Using FIG. 10 and FIG. 11, a method of generating the communication permission list using the state transition model generated by the method described with reference to FIG. 9 will be described.

First, as illustrated in FIG. 10, the list generation unit 152 extracts the communication data permitted in each state of the state transition model generated earlier and tabulates the communication data into the communication permission list. In this case, a transition condition and a transition destination state are also tabulated.

Subsequently, as illustrated in FIG. 11, the list generation unit 152 aggregates the states where the inclusion relation is established among the communication data permitted in the communication permission list in FIG. 10. On this occasion, the states defined in transition destinations are also aggregated. To take an example, the inclusion relation is established among the state 1-2, the state 2, and the state 3-2. Thus, these states are aggregated into the state 1-2, as illustrated in FIG. 11, and the transition destinations corresponding to these states are also aggregated.

When the state transition model and the communication permission list generated outside the data determination apparatus by the above-mentioned method or other method are installed into the data determination apparatus, it may be so arranged that the state transition model and the communication permission list are imported with an electronic signature, and that the signature is verified by the data determination apparatus. Falsification of the state transition model and the communication permission list may be detected by such a process. An RSA signature or an ECDSA signature, for example, may be used as the electronic signature.

As mentioned above, the data determination apparatus 101b according to this embodiment includes the list generation unit to generate the state transition model and the communication permission list using the obtained information history.

The list generation unit uses the following processes for generating the state transition model and the communication permission list:

(1) the process of setting a wait state if a period of time elapsed between communication data is a certain period or more, turning on the timer if a transition is made to the wait state and transitioning the wait state to a subsequent state by turning off the timer;

(2) the process of setting as a change point in each operating state, a point of time when an input other than communication data has been generated, and setting each of states before and after the change point to a new operating state;

(3) the process of setting, as a change point, specific communication data in the operating state set in (2) and setting each of states before and after the change point to a new operating state;

(4) the process of listing the data communicated in each operating state as communication data that has been permitted;

(5) the process of using a predetermined clustering method when the specific communication data is determined in (3); and (6) the process of aggregating, into one operating state, the operating states in which an inclusion relation is established among the communication data permitted.

This embodiment also includes a process of verifying a signature given to the state transition model and the communication permission list and detecting falsification when the state transition model and the communication permission list generated outside are installed into the data determination apparatus 101b.

\*\*\*Description of Advantageous Effects of this Embodiment\*\*\*

According to the data determination apparatus 101b in this embodiment, in addition to the advantageous effects of the first embodiment, the state transition model and the communication permission list may be automatically generated using the obtained information history. Accordingly, a burden of the designer may be reduced.

Third Embodiment.

In this embodiment, a difference from the first and second embodiments will be mainly described.

Same reference signs are assigned to components which are the same as those described in the first and second embodiments, and a description of these components may be omitted.

In the first and second embodiments, the data determination apparatus 101 is connected between the network 102 and the controller 300. In this embodiment, however, a description will be given about a configuration of a data determination apparatus 101c capable of being installed between a server and a controller will be described.

\*\*\*Description of Configuration\*\*\*

Figure 12:
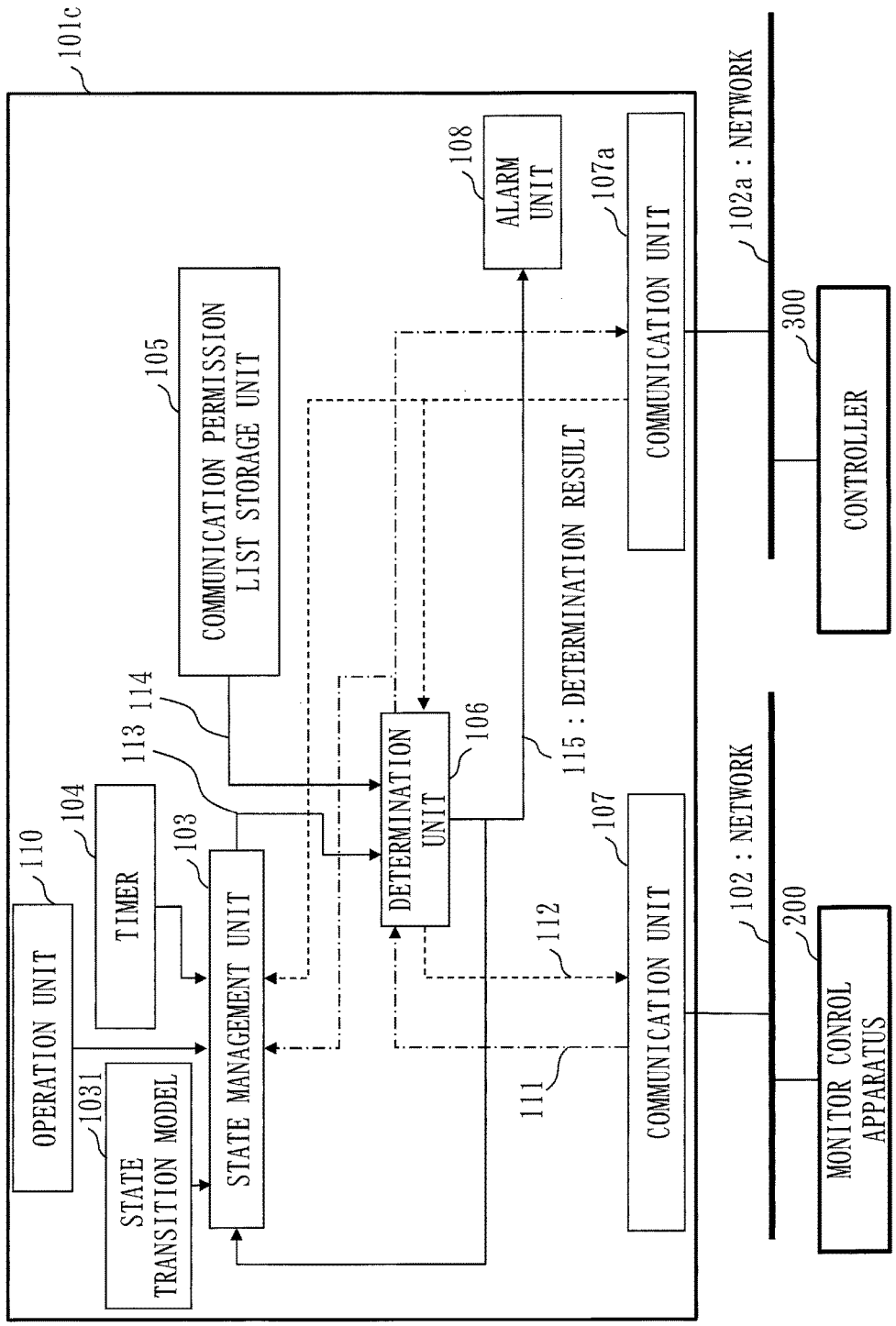
FIG. 12 is a block configuration diagram of a data determination apparatus according to a third embodiment.

A block configuration of the data determination apparatus 101c according to this embodiment will be described, using FIG. 12.

The data determination apparatus 101c is connected to the monitor control apparatus 200 that is the server via the network 102, and is connected to the controller 300 via a network 102a. The data determination apparatus 101c includes the communication unit 107 and a communication unit 107a respectively corresponding to the network 102 and the network 102a.

Figure 13:
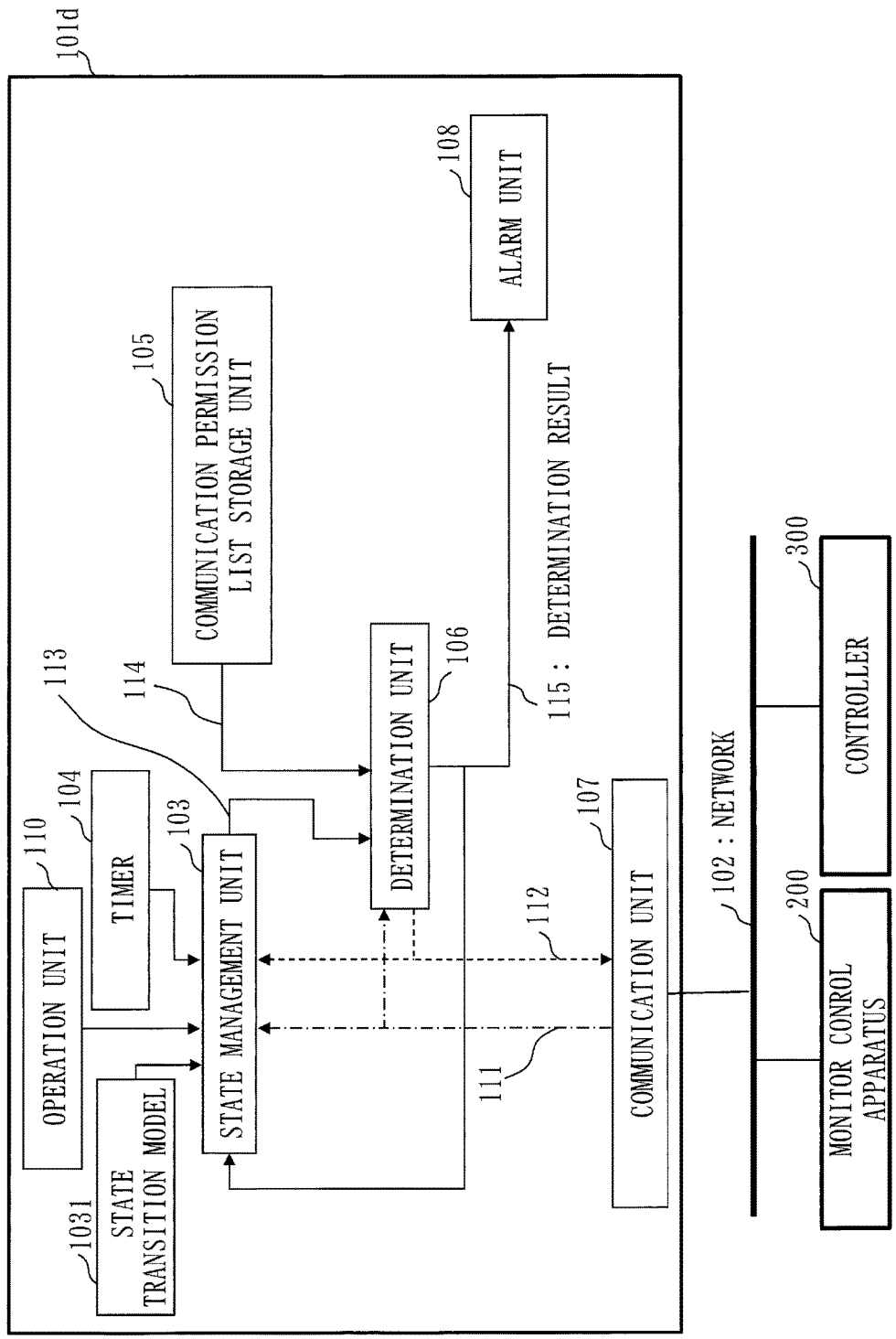
FIG. 13 is a block configuration diagram of a data determination apparatus to perform a different operation from the data determination apparatus in FIG. 12.

A block configuration of a data determination apparatus 101d to perform a different operation from the data determination apparatus 101c in FIG. 12 will be described, using FIG. 13. As illustrated in FIG. 13, the data determination apparatus 101d may be so configured that the determination unit 106 captures a communication between the monitor control apparatus 200 and the controller 300. In the data determination apparatus 101d illustrated in FIG. 13, the monitor control apparatus 200 and the controller 300 are connected to one network 102.

\*\*\*Description of Operations\*\*\*

The data determination apparatus 101c determines about a communication from the monitor control apparatus 200 to the controller 300 and a communication from the controller 300 to the monitor control apparatus 200, like the data determination apparatuses described in the first and second embodiments. The determination operation of the data determination apparatus 101c is the same as that in the first embodiment.

Operations of the data determination apparatus 101d are similar to those of the data determination apparatus 101a in the first embodiment. However, with regard to items in a communication permission list, in addition to a transmission source address, a command type, a data size upper limit, a data setting range, and so on, a transmission determination address may also be defined.

\*\*\*Description of Advantageous Effect of this Embodiment\*\*\*

In the first and second embodiments, the data determination apparatus 101 is installed for each controller 300. Thus, when the number of the controllers 300 increases, the cost increases. In this embodiment, it is enough to install one data determination apparatus 101 for one or more of the networks, so that the cost may be reduced.

In the above-mentioned embodiments, each of the state management unit, the determination unit, and the alarm unit constitutes the data determination apparatus as an independent functional block. The data determination apparatus, however, does not need to be configured as mentioned above, and an arbitrary configuration may be employed for the data determination apparatus. The state management unit, the determination unit, and the alarm unit may be implemented as one functional block. Alternatively, the state management unit and the determination unit may be implemented as one functional block, or the determination unit and the alarm unit may be implemented as one functional block.

The data determination apparatus may be a data determination system constituted from a plurality of apparatuses rather than one apparatus. Arbitrary functional blocks may be employed for the data determination apparatus if they may implement the functions described in each of the embodiments, and the data determination apparatus may be constituted using any other combination of these functional blocks.

The first to third embodiments have been described; however, a plurality of these three embodiments may be implemented in combination. Alternatively, one of these three embodiments may be implemented in part. Alternatively, a plurality of these three embodiments may be implemented in partial combination. These three embodiments may be arbitrarily implemented in whole or partial combination.

Note that the above-mentioned embodiments are essentially preferable illustrations, do not intend to limit the present invention and the range of application and use of the present invention, and various modifications are possible as necessary.

Fourth Embodiment

In this embodiment, a description will be mainly directed to a difference from the first embodiment.

Though a basic operation of a data determination apparatus 101e according to this embodiment is the same as that of the data determination apparatus 101 described in the first embodiment, configurations of a communication permission list 114e and a state transition model 1031e, and an operation of a determination process S120e are different from those in the first embodiment.

Same reference signs are assigned to components which are the same as those described in the first embodiment, and a description of these components may be omitted.

*Description of Configuration*

Figure 14:
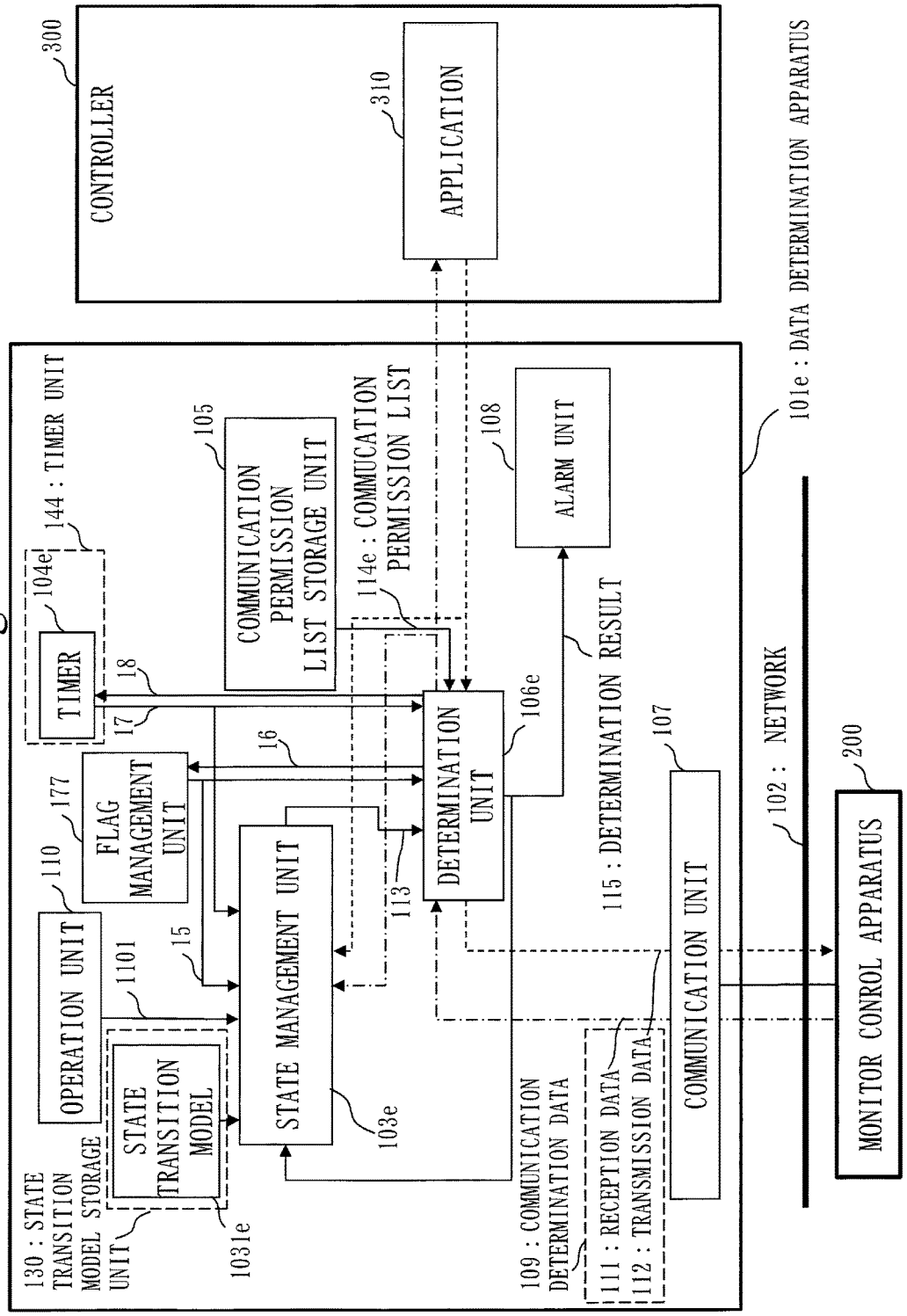
FIG. 14 is a block configuration diagram of a data determination apparatus according to a fourth embodiment.

A block configuration of the data determination apparatus 101e according to this embodiment will be described, using FIG. 14. FIG. 14 corresponds to FIG. 1 described in the first embodiment.

The data determination apparatus 101e according to this embodiment includes, in addition to the configuration of the data determination apparatus 101 described in the first embodiment, a flag management unit 177. The timer 104, the state management unit 103, and the determination unit 106 described in the first embodiment are respectively designated as a timer 104e, a state management unit 103e, and a determination unit 106e in this embodiment because they are different from the timer 104, the state management unit 103, and the determination unit 106 in the first embodiment.

Accordingly, in the data determination apparatus 101e according to this embodiment, functions of the flag management unit 177, the timer 104e, the state management unit 103e, and the determination unit 106e are added to the functions of the "unit" described in the first embodiment.

The flag management unit 177 manages each flag. The flag management unit 177 supplies a flag value 15 that is a current flag value to the state management unit 103e and the determination unit 106e. A flag set value 16 is supplied from the determination unit 106e to the flag management unit 177.

The timer 104e measures a period of time. Specifically, the timer 104e decrements a set value at a certain period, or that is, for each 1 ms, and finishes the decrementation when the value becomes 0. The timer 104e supplies, to the state management unit 103e and the determination unit 106e a timer value 17 that is a current value. A timer set value 18 is supplied from the determination unit 106e to the timer 104e. In this embodiment, the timer 104e is an example of a timer unit 144 to measure a period of time. A description of a timer signal 1041 described in the first embodiment will be omitted.

The state transition model 1031e having a different configuration from the state transition model 1031 described in the first embodiment is stored in the state transition model storage unit 130.

The communication permission list 114e having a different configuration from the communication permission list 114 described in the first embodiment is stored in the communication permission list storage unit 105. As illustrated in FIG. 16, communication permission rules 14 are stored in the communication permission list 114e. The communication permission rules 14 include communication permitted data 119e whose communications are permitted in respective operating states of a plurality of operating states, a permission condition 192 under which communication of each communication permitted data 119e is permitted, and a permission process 193 when the communication of each communication permitted data is permitted.

As described in the first embodiment, the determination unit 106e receives reception data 111 from the communication unit 107 or receives transmission data 112 from the application 310, and obtains an operating state of an own apparatus held by the state management unit 103e, as a current operating state 113. The determination unit 106e obtains the timer value 17 from the timer 104e and obtains the flag value 15 from the flag management unit 177. The determination unit 106e determines whether or not communication determination data 109 satisfies the communication permission rule 14 that permits communication in the current operating state 113, using the current operating state 113, the timer value 17, the flag value 15, and the communication permission list 114e.

The determination unit 106e will be further described.

The determination unit 106e obtains the reception data 111 or the transmission data 112, the current operating state 113 output from the state management unit 103e, the communication permission list 114e stored by the communication permission list storage unit 105, the flag value 15 managed by the flag management unit 177, and the timer value 17 managed by the timer 104e. The determination unit 106e compares the reception data 111 or the transmission data 112 obtained, with respect to the current operating state 113, the communication permission list 114e and the flag value 15, and the timer value 17, determines whether or not the reception data 111 or the transmission data 112 is permitted one, and outputs a determination result 115.

If the determination unit 106e determines that the communication determination data 109 satisfies the communication permission rule 14 included in the communication permission list 114e, the determination unit 106e permits the communication and executes an action described in the communication permission rule 14 satisfied, or the permission process 193. Specifically, the determination unit 106e sets a flag permitted value described in the communication permission rule 14 in the flag management unit 177 as the flag set value 16, and sets a timer permitted value described in the communication permission rule 14 in the timer 104e as the timer set value 18.

If the determination unit 106e determines that the communication determination data 109 does not satisfy the communication permission rule 14, the determination unit 106e blocks the communication. That is, if the determination result 115 indicates abnormality, the determination unit 106e blocks the communication.

If the communication determination data 109 has been determined not to satisfy the communication permission rule 14 by the determination unit 106e, the alarm unit 108 outputs an alarm indicating detection of the abnormality. That is, as in the first embodiment, the alarm unit 108 issues the alarm if the determination result 115 indicates the abnormality.

If the communication determination data 109 has been determined to satisfy the communication permission rule 14 by the determination unit 106e, the state management unit 103e transitions the operating state of the own apparatus, based on the state transition model 1031e.

If the communication determination data 109 has been determined not to satisfy the communication permission rule 14 by the determination unit 106e, the state management unit 103e transitions the operating state of the own apparatus to an abnormal state.

Alternatively, it may be so arranged that, as in the first embodiment, the state management unit 103e only transitions the state if the determination result 115 has been determined to be normal.

As mentioned above, the state management unit 103e holds the current operating state 113 of the data determination apparatus 101e that is the own apparatus.

Figure 15:
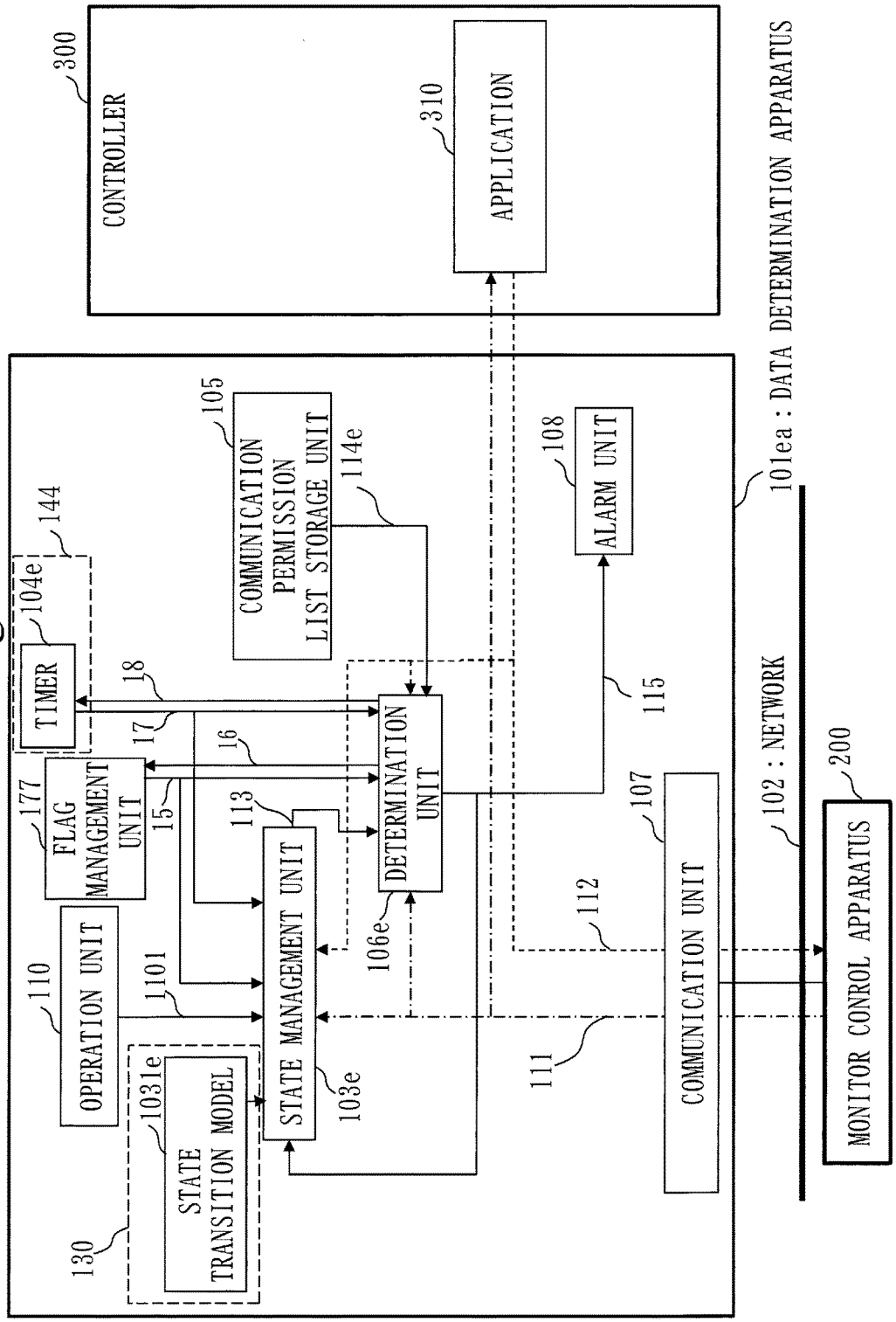
FIG. 15 is a block configuration diagram of a data determination apparatus to perform a different operation from the data determination apparatus in FIG. 14.

Using FIG. 15, a block configuration of a data determination apparatus 101ea to perform a different operation from the data determination apparatus 101e in FIG. 14 will be described. FIG. 15 corresponds to FIG. 2 described in the first embodiment.

Figure 2:
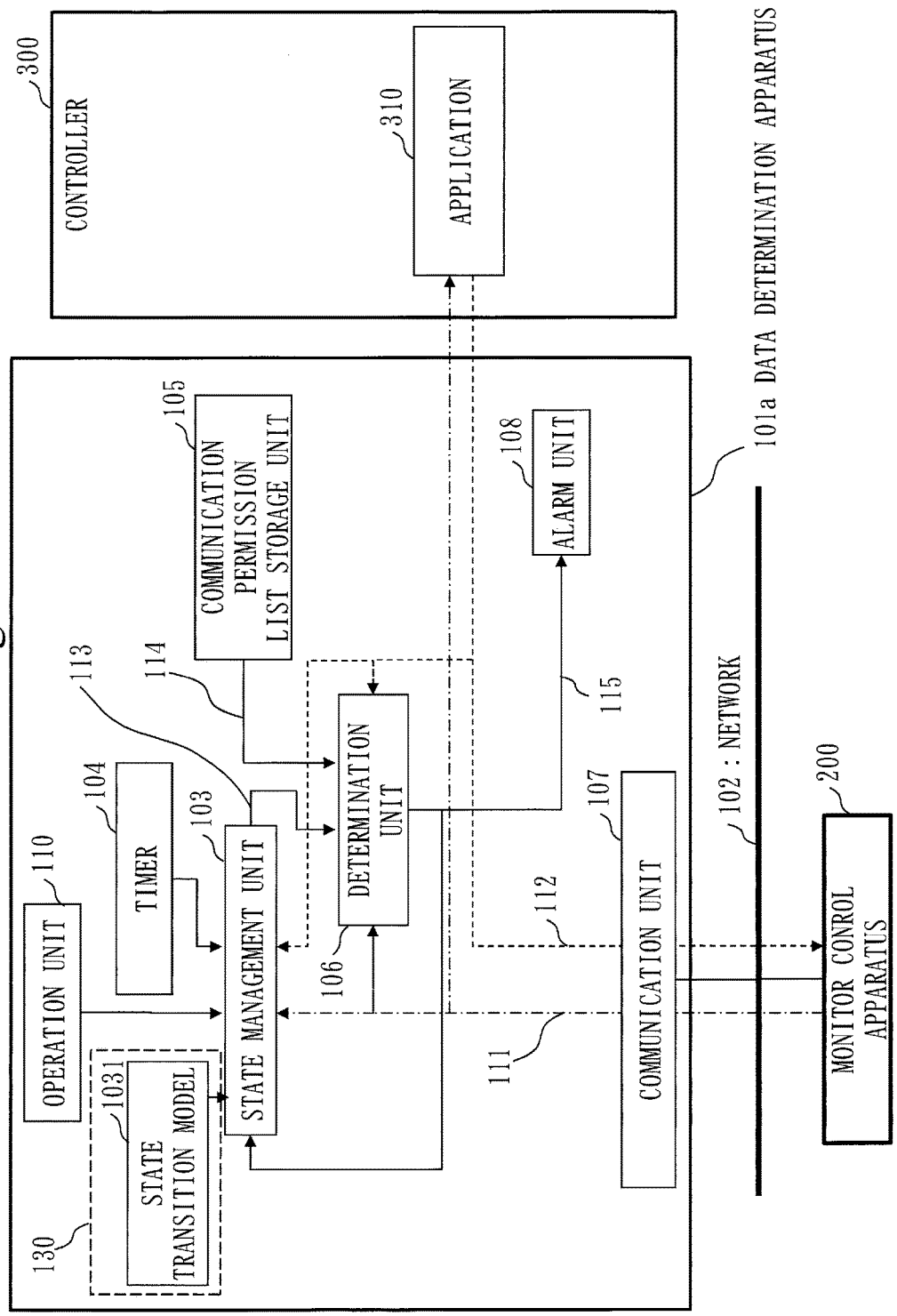
FIG. 2 is a block configuration diagram of a data determination apparatus to perform a different operation from the data determination apparatus in FIG. 1.

It may be so configured that, in a similar way to FIG. 2 described in the first embodiment, the determination unit 106e captures a communication between the monitor control apparatus 200 and the application 310, as in the data determination apparatus 101ea illustrated in FIG. 15. In the data determination apparatus 101ea in FIG. 15, the determination unit 106e cannot block the communication if a determination result 115 indicates abnormality. However, an attack may be coped with by an alarm issued by the alarm unit 108.

A configuration of the communication permission list 114e according to this embodiment will be described, using FIG. 16.

FIG. 16 illustrates an example of the communication permission list 114e permitted in the respective operating states held by the state management unit 103e. The communication permission list 114e in FIG. 16 is the example, and does not necessarily need to be as in FIG. 16.

As illustrated in FIG. 16, the communication permission list 114e includes items such as an operating state, a rule number, a reception data condition, and an action. The reception data condition includes the communication permitted data 119e and the permission condition 192.

Information such as a transmission source address, a command type, a data size upper limit, and a data setting range is set in each communication permitted data 119e, as in the first embodiment.

The permission condition 192 includes a timer permitted value 1921 that indicates a value range of the timer unit 144 to permit communication of the communication permitted data 119e and a flag permitted value 1922 that is a flag value which permits the communication of the communication permitted data 119e.

The action is the permission process 193 when the communication of the communication permitted data 119e is permitted. The action includes the timer set value 18 to be set in the timer unit 144 when the communication of the communication permitted data 119e is permitted and the flag set value 16 to be set in the flag when the communication of the communication permitted data 119e is permitted.

These items are arbitrary, and an item other than the above-mentioned items may be employed if it is the item capable of identifying communication data whose communication is permitted.

FIG. 16 specifically indicates that only rules 1 and 2 are permitted and no rule other than the rules 1 and 2 is permitted when the operating state is NW construction. FIG. 16 further indicates that only rules 3a, 3b, 3c, 7, and 4 are permitted and no rule other than the rules 3a, 3b, 3c, 7, and 4 is permitted when the operating state is an operation A. FIG. 16 further indicates that no communications are permitted when the operating state is abnormal.

The communication permission rule 14 indicates each row of the communication permission list 114e in which permission or no permission is set in the operating state. The rules 1 to 10 are set as the communication permission rules 14 in FIG. 16. FIG. 16 indicates that the no communications are permitted when the operating state is abnormal.

Figure 17:
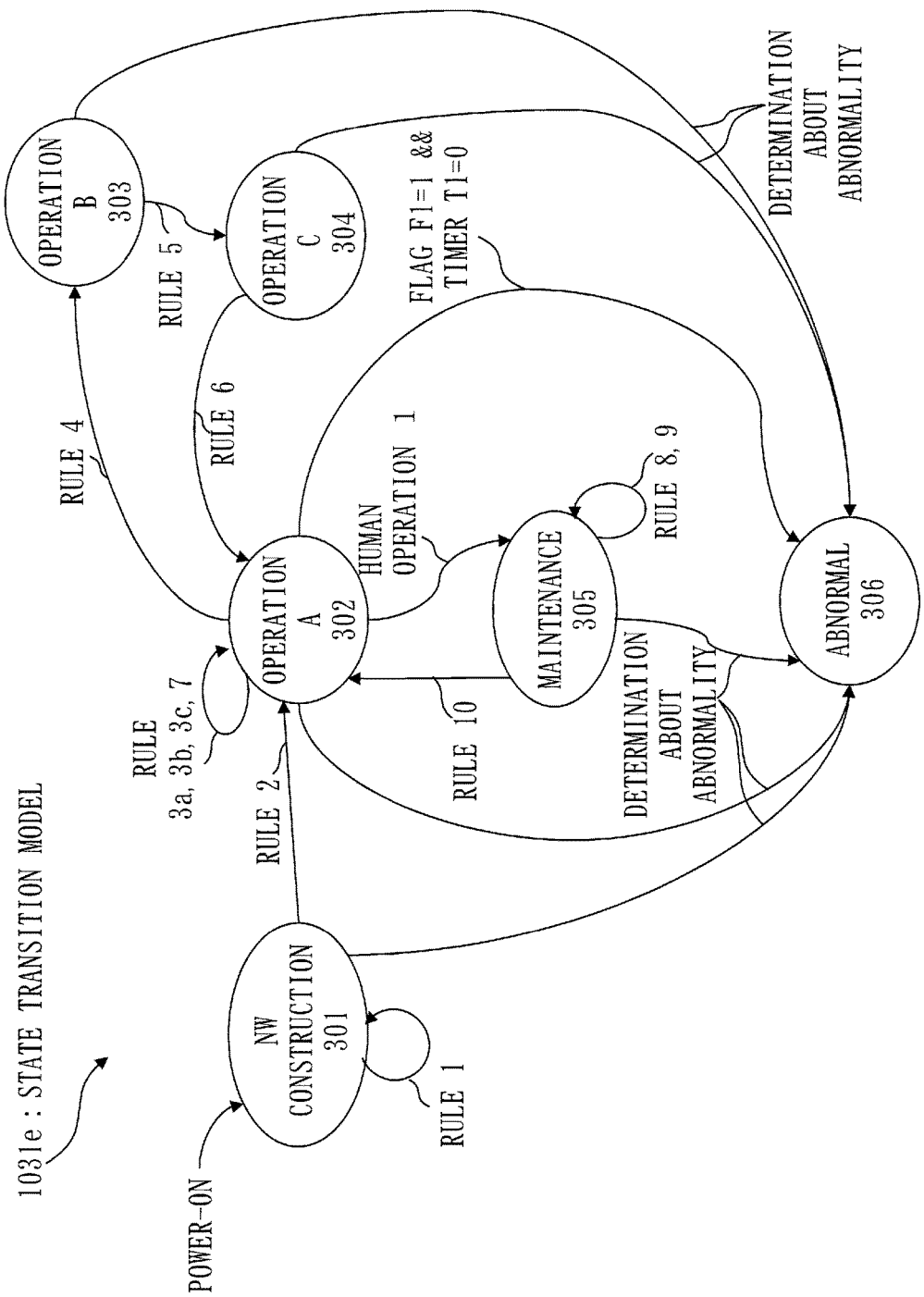
FIG. 17 is a diagram illustrating an example of a state transition model of the data determination apparatus according to the fourth embodiment.

An example of the state transition model 1031e of the data determination apparatus 101e according to this embodiment will be described, using FIG. 17. FIG. 17 indicates the example, and the state transition model 1031e does not necessarily need to be as in FIG. 17.

In FIG. 17, states 301 to 306 indicate respective examples of the plurality of operating states, as in the first embodiment. Further, inter-states indicate respective examples of inter-states between the respective operating states.

In FIG. 17, the data determination apparatus 101e transitions to the NW construction state 301 when powered on, and performs a communication necessary for the NW construction. A rule to be applied to the communication necessary for the NW construction is set to the rule 1 in the data determination apparatus 101e. In the following description as well, network construction is described as the NW construction. When the NW construction is completed and the rule 2 is applied, a transition to the operating A-state 302 is made in the state transition model 1031e.

If there are communications whose order of communication data is prescribed, the state transition model 1031e further defines the operating states according to the order of the communications prescribed. As a specific example of the communications prescribed, there are communications prescribed to perform reception in the order of "transmit parameter file", "set parameter file", and "verify". It is so defined in the state transition model 1031e that when the rule 4 for making determination about "transmit parameter file" is applied in the operating-A state 302, a transition to the operating-B state 303 is made, a transition to the operating C-state 304 is made when the rule 5 is applied, and then a transition to the operating-A state 302 is made when the rule 6 is applied. As mentioned above, conditions of the transitions to the respective operating states may be assigned to the rules 4, 5, and 6.

A description will be given below, assuming that the timer value 17 is set to T1 and the flag value 15 is set to F1.

There may be a communication for which a certain period of time needs to be provided after receipt of a command in the operating A-state 302. Specifically, the communication is to "set operation data" in the rule 7 in FIG. 16. In the rule 7, "set operation data" is accepted under a condition that the T1 is 0 or the T1=0 set in the timer permitted value 1921 as in the permission condition 192, and then a predetermined value is set in the T1, as in the permission process 193. Specifically, when an interval of 100 ms is provided for the timer to perform decrementation for each 1 ms, 100, which is the timer set value 18, is set in the T1. That is, it is set that the T1=100.

Alternatively, the communication is the one necessary to receive a command at an interval of b seconds (with an error±d seconds), or that is the communication to "obtain state data" in each of the rules 3a and 3b in FIG. 16. In each of the rules 3a and 3b, when each of the T1 and the F1 fits a permitted value set in the permission condition 192, the communication is permitted, and a set value set in the permission process 193 is set in each of the T1 and the F1. When the state data acquisition is finished, a state data acquisition completion command is issued, and the T1 and the F1 are cleared upon receipt of this state data acquisition completion command, as in the rule 3c. In other words, 0, which is set in the permission process 193 is set in each of the T1 and the F1. Further, when the F1 becomes 1 and the T1 becomes 0 in the operating A-state 302, a transition may be made to the abnormal state 306, as illustrated in FIG. 17.

A transition may be made to the maintenance state 305 by a human operation 1 in the operating-A state 302 to perform communications necessary for maintenance, or specifically to perform program updating and verify. If the maintenance is completed and the rule 10 is applied in the maintenance state 305, a transition is made to the operating A-state 302. It may be so arranged that when a state transition using communication data is further made, the transition is made only if a determination result by the determination unit 106e has been normal. If the determination result by the determination unit 106e has been abnormal in each state, a transition may be made to the abnormal state 306.

\*\*\*Description of Operations\*\*\*

Figure 18:
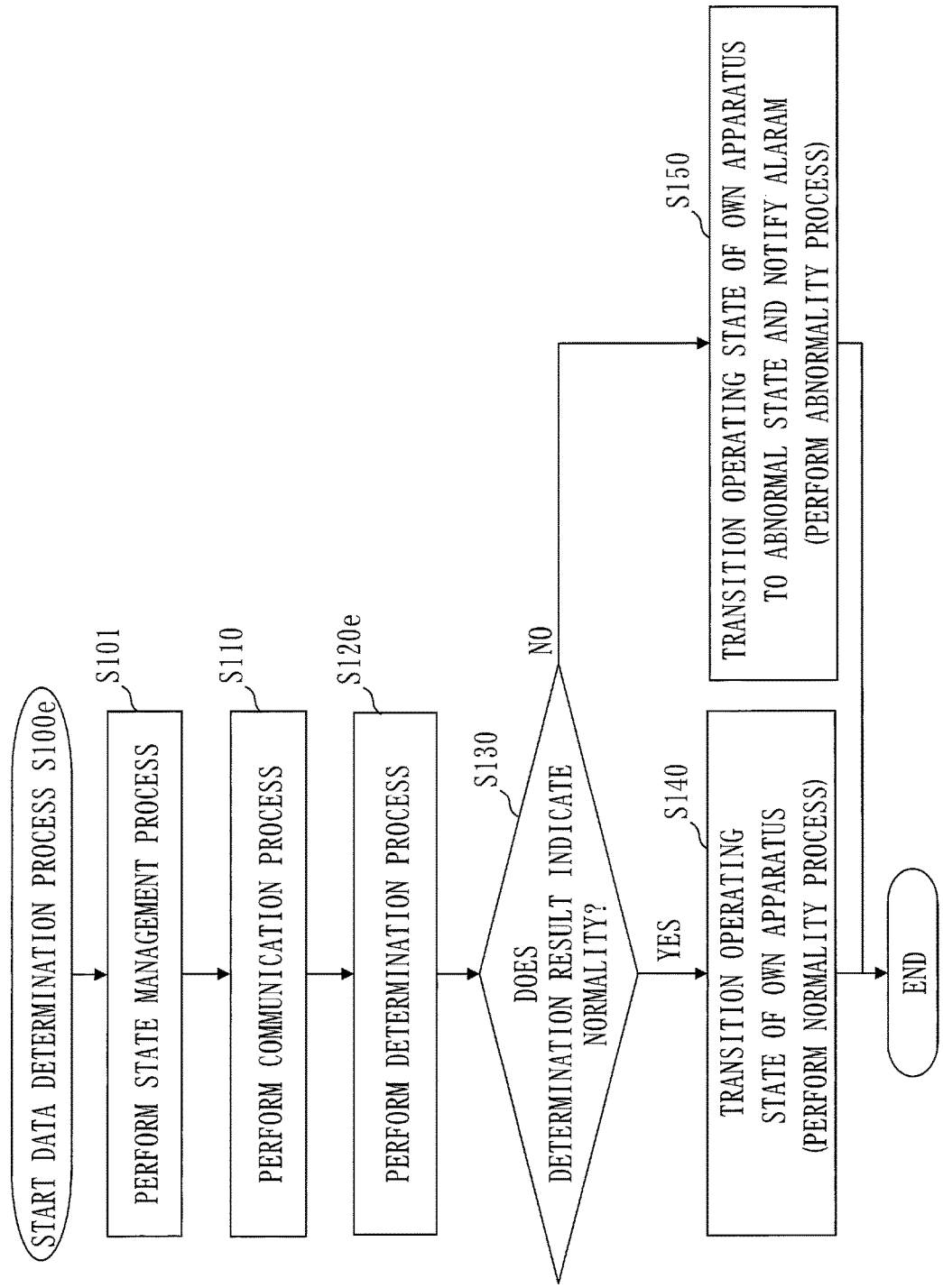
FIG. 18 is a flow diagram illustrating a data determination method or a data determination process of the data determination apparatus according to the fourth embodiment.

A data determination method or a data determination process S100e of the data determination apparatus 101e according to this embodiment will be described, using FIG. 18. The data determination process S100e is different from the data determination process S100 in the first embodiment in the determination process S120e. Since processes other than the determination process S120e are the same as those in the first embodiment, the description will be given briefly.

As described above, the data determination apparatus 101e includes the state transition model storage unit 130 to store the state transition model 1031e and the communication permission list storage unit 105 to store the communication permission rule 14 as the communication permission list 114e.

In a state management process S101, the state management unit 103e executes the state management process S101 to hold an operating state of the own apparatus, based on the state transition model 1031e. The state management unit 103e transitions an operating state of the own apparatus based on the state transition model 1031e, thereby holding a latest operating state.

A communication process S110 is the same as that described in the first embodiment.

In the determination process S120e, the determination unit 106e obtains communication determination data 109 obtained in the communication process S110 and obtains the operating state of the own apparatus held in the state management process S101, as a current operating state 113. Further, the determination unit 106e obtains a timer value 17 from the timer 104e and obtains a flag value 15 from the flag management unit 177. The determination unit 106e determines whether or not the communication determination data 109 satisfies the communication permission rule 14 in the current operating state 113, using the current operating state 113, the timer value 17, the flag value 15, and the communication permission list 114e.

Specifically, the determination unit 106e determines whether or not the communication determination data 109 satisfies the communication permission rule 14 using a determination result indicating whether or not the timer value 17 is within the range of the timer permitted value 1921. Alternatively, the determination unit 106e may determine whether or not the communication determination data 109 satisfies the communication permission rule 14, using a determination result indicating whether not the timer value 17 is within the range of the timer permitted value 1921 and whether or not the flag value 15 is the flag permitted value 1922. That is, the determination unit 106e outputs a determination result 115 indicating whether or not the communication determination data 109 satisfies the communication permission rule 14 based on the determination result indicating whether or not the communication determination data 109 satisfies the permission condition 192, as illustrated in FIG. 16, if the determination unit 106e has determined that the communication determination data 109 is the communication permitted data 119e.

If the determination result 115 indicates normality or the communication determination data 109 satisfies the communication permission rule 14 in S130, the procedure proceeds to a normality process S140.

If the determination result 115 indicates abnormality or the communication determination data 109 does not satisfy the communication permission rule 14 in S130, the procedure proceeds to an abnormality process S150.

In the normality process S140, the state management unit 103e transitions the operating state of the own apparatus, based on the communication determination data 109 obtained and the state transition model 1031e.

In the abnormality process S150, the state management unit 103e transitions the operating state of the own apparatus to the abnormal state.

Subsequently, the determination process S120e by the determination unit 106e will be described, using FIG. 19. The determination process S120e is different from the determination process S120 in the first embodiment in S123e and S124e. Since processes other than S123e and S124e are similar to those in the first embodiment, the description will be given briefly.

In S121, the determination unit 106e obtains reception data 111 or transmission data 112 as the communication determination data 109. The determination unit 106e analyzes contents of the communication determination data 109 to extract elements necessary for the determination. The elements to be extracted are the items described in the communication permission list 114e, and are information such as the transmission source address and the command type.

In S122, the determination unit 106e obtains the current operating state 113 from the state management unit 103e. The determination unit 106e obtains the communication permission list 114e from the communication permission list storage unit 105.

In S123e, the determination unit 106e determines whether or not the communication determination data 109 is communication data permitted in the current operating state 113 or the communication determination data 109 satisfies the communication permission rule 14, based on the current operating state 113 and the communication permission list 114e.

If the communication determination data 109 is determined to satisfy the communication permission rule 14, the procedure proceeds to S124e.

If the communication determination data 109 is determined not to satisfy any one of the communication permission rules 14, the procedure proceeds to S125.

In S125, the determination unit 106e outputs the determination result 115 indicating the abnormality, and blocks communication of the communication determination data 109. Alternatively, the determination unit 106e just outputs the determination result 115 indicating the abnormality, and does not need to block the communication of the communication determination data 109. This process is the same as that described in the first embodiment.

In S124e, the determination unit 106e permits the communication and executes the action associated with the communication permission rule 14 satisfied by the communication determination data 109 if there is that action. That is, the determination unit 106e outputs the determination result 115 indicating the normality and permits the communication and executes the action associated with the communication permission rule 14 satisfied by the communication determination data 109 if there is that action. Specifically, the determination unit 106e sets a flag set value 16 in the flag management unit 177 and sets a timer set value 18 in the timer 104e.

The determination process 120e will be described below, using a specific example.

The description will be given about a case where the data determination apparatus 101e has received communication determination data 109 that satisfies each of the rules 4, 5, and 6.

It is assumed that the data determination apparatus 101e has received the communication determination data 109 in the operating-A state 302 and has determined that the communication determination data 109 is to "transmit parameter file" in the rule 4, using the transmission source address, the command type, and the data size of the communication determination data 109. The data determination apparatus 101e permits communication and transitions the operating state to the operating-B state 303.

It is assumed that the data determination apparatus 101e has received the communication determination data 109 in the operating-B state 303 and has determined that the communication determination data 109 is to "set parameter file" in the rule 5, using the transmission source address, the command type, and the data size of the communication determination data 109. The data determination apparatus 101e permits communication and transitions the operating state to the operating-C state 304.

It is assumed that the data determination apparatus 101e has received the communication determination data 109 in the operating-C state 304 and has determined that the communication determination data 109 is to "verify" in the rule 6, using the transmission source address, the command type, and the data size of the communication determination data 109. The data determination apparatus 101e permits communication and transitions the operating state to the operating-A state 302.

Now, a description will be directed to a case where the data determination apparatus 101e has received communication determination data 109 associated with the rule 7.

It is assumed that the data determination apparatus 101e has received the communication determination data 109 in the operating-A state 302, and has determined that the communication determination data 109 is to "set operation data" in the rule 7, based on the transmission source address, the command type, the data size, and the data setting range of the communication determination data 109, the timer value 17, and the flag value 15. The data determination apparatus 101e permits communication and sets a timer setting value to 100 ms.

By performing the determination process S120e as mentioned above, a communication necessary for providing a certain period of time after receipt of a command may also be determined to be normal or not.

Subsequently, a description will be directed to a case where the data determination apparatus 101e has received communication determination data 109 that satisfies each of the rules 3a, 3b, and 3c. Each of the rules 3a, 3b, and 3c is for a communication necessary for receiving a command at an interval of about b seconds in the operating-A state 302. It is assumed that this communication allows an error of ±d seconds for the b seconds.

It is assumed that the data determination apparatus 101e has received the communication determination data 109 in the operating-A state 302 and has determined that the communication determination data 109 is to "obtain state data" in the rule 3a, based on the transmission source address, the command type, and the data size of the communication determination data 109, the timer value 17, and the flag value 15. The data determination apparatus 101e permits communication and sets b+d in the T1 that is the value of the timer 104e and sets the F1 that is the flag value to 1.

It is assumed that the data determination apparatus 101e has received the communication determination data 109 in the operating-A state 302 and has determined that the communication determination data 109 is to "obtain state data" in the rule 3b, based on the transmission source address, the command type, and the data size of the communication determination data 109, the timer value 17, and the flag value 15. The data determination apparatus 101e permits communication and sets b+T1 in the T1.

It is assumed that the data determination apparatus 101e has received the communication determination data 109 in the operating-A state 302 and has determined that the communication determination data 109 is to "finish obtaining state data" in the rule 3c, based on the transmission source address, the command type, and the data size of the communication determination data 109, the timer value 17, and the flag value 15. The data determination apparatus 101e permits communication and initializes each of the T1 and the F1 to 0.

By performing the determination process S120e as mentioned above, a communication necessary for receiving a command at a certain interval may also be determined to be normal or not.

Then, a description will be given about a case where the data determination apparatus 101e has transitioned to the maintenance state by a human operation and has received communication determination data 109 that satisfies each of the rules 8, 9, and 10. Each of the rules 8, 9, and 10 is a communication necessary for maintenance in the maintenance state 305.

It is assumed that the data determination apparatus 101e has received the communication determination data 109 in the maintenance state 305, and has determined that the communication determination data 109 is to "update program" in the rule 8, based on the transmission source address, the command type, and the data size of the communication determination data 109. The data determination apparatus 101e permits communication.

It is assumed that the data determination apparatus 101e has received the communication determination data 109 in the maintenance state 305, and has determined that the communication determination data 109 is to "verify" in the rule 9, based on the transmission source address, the command type, and the data size of the communication determination data 109. The data determination apparatus 101e permits communication.

It is assumed that the data determination apparatus 101e has received communication the determination data 109 in the maintenance state 305, and has determined that the communication determination data 109 is to "complete maintenance" in the rule 9, based on the transmission source address, the command type, and the data size of the communication determination data 109. The data determination apparatus 101e permits communication and transitions the operating state to the operating-A state 302.

By the above description, the description of the data determination method or the data determination process S100e of the data determination apparatus 101e according to this embodiment will be finished.

As described above, the data determination apparatus according to this embodiment includes the following components:

(A) the state management unit to manage each operating state, according to the state transition model to transition according to at least one of communication data, an external operation, and the timer;

(B) the communication permission list storage unit to store the communication permission list that defines the communication data to be permitted for the respective operating states;

(C) the determination unit to determine whether or not the communication data supplied to the data determination apparatus is normal, using a current operating state output by the state management unit, the communication permission list stored by the communication permission list storage unit, a timer value, and a flag value; and (D) the alarm unit to issue the alarm, based on a determination result output by the determination unit.

The state management unit manages the operating state, according to the state transition model to transition based on the determination result output by the determination unit. The determination unit blocks the communication data that the determination unit has determined to be abnormal. Further, the determination unit executes the action described in the communication permission rule when the determination unit has determined the communication data to be normal. That is, when the determination unit determines that the determination result to be normal, the determination unit sets at least one of the timer and the flag to a predetermined value.

\*\*\*Description of Advantageous Effects of This Embodiment\*\*\*

In an attack such as the Stuxnet described before for comparison, a server that has been taken over performs program rewriting on a controller. The program rewriting itself is a normal communication and the server that has been taken over is also a server defined to be normal. Thus, the attack such as the Stuxnet cannot be prevented by the countermeasure of the white-list type.

On the other hand, in the data determination apparatus according to this embodiment, a transition of each operating state by a human operation or the timer as well as communication data is also defined. Accordingly, by making a countermeasure such that program rewriting is accepted only at a time of the maintenance state and the transition to the maintenance state is made just by the human operation, the attack as mentioned above may be detected.

The controller on which the program rewriting has been performed by the Stuxnet highly frequently transmits, to a frequency converter to be controlled, a command to change a frequency, thereby inducing a failure of the apparatus. The data determination apparatus according to this embodiment may detect such a frequency changing command highly frequently transmitted, using the timer.

According to the data determination apparatus in this embodiment, deviation from a correct communication order may also be detected.

In the data determination apparatus according to this embodiment, it may be detected whether or not a reception interval is fixed. Thus, a phenomenon such as a disconnection or a stop of the monitor control apparatus due to an attack may also be detected. Even when reception intervals of a plurality of communications are managed in that case, a description of a state transition diagram may be simplified, so that resources related to the detection may be reduced. When reception interval control is performed just by a state transition, a number of states $n^2$ with respect to a number of target communications n must be managed. According to the data determination apparatus in this embodiment, however, the management may be performed using one state.

Further, according to the data determination apparatus in this embodiment, issuance of a command that is not originally supposed to be issued by the monitor control apparatus that has been attacked and data acquisition from the monitor control apparatus that does not operate to perform the data acquisition may also be detected.

In addition to the first to third embodiments, the fourth embodiment has been described; however, a plurality of these four embodiments may be implemented in combination. Alternatively, one of these four embodiments may be implemented in part. Alternatively, a plurality of these four embodiments may be implemented in partial combination. These four embodiments may be arbitrarily implemented in whole or partial combination.

Note that the above-mentioned embodiments are essentially preferable illustrations, do not intend to limit the present invention and the range of application and use of the present invention, and various modifications are possible as necessary.

REFERENCE SIGNS LIST 101, 101a, 101b, 101c, 101d, 101e, 101ea: data determination apparatus, 102, 102a: network, 103, 103e: state management unit, 104, 104e: timer, 105: communication permission list storage unit, 106, 106e: determination unit, 107, 107a: communication unit, 108: alarm unit, 109: communication determination data, 110: operation unit, 111: reception data, 112: transmission data, 113: current operating state, 114, 114e: communication permission list, 115: determination result, 119, 119e: communication permitted data, 130: state transition model storage unit, 151: obtained information history, 152: list generation unit, 153: history storage unit, 200: monitor control apparatus, 300: controller, 301, 302, 303, 304, 305, 306, 307: state, 310: application, 500: data determination system, 701: first change point, 702: second change point, 703: transition communication data, 901: processor, 902: auxiliary storage device, 903: memory, 904: communication device, 905: input interface, 906: display interface, 907: input device, 908: display, 910: signal line, 911, 912: cable, 9041: receiver, 9042: transmitter, 1031, 1031e: state transition model, 1032: operating state of own apparatus, 1033: obtained information, 1041: timer signal, 1101: operation signal, 3001: a plurality of operating states, 3002: inter-states in the respective operating states, S101: state management process, S100, S100e: data determination process, S110: communication process, S120, S120e: determination process, S140: normality process, and S150: abnormality process, S144: timer unit, 14: communication permission rule, 15: flag value, 16: flag set value, 17: timer value, 18: timer set value, 177: flag management unit, 192: permission condition, 193: permission process, 1921: timer permitted value, 1922: flag permitted value.

The invention claimed is:
1. A data determination apparatus comprising:
processing circuitry configured to
measure a period of time during which an operating state of the data determination apparatus continues;

store a state transition model representing a state transition between respective operating states of a plurality of operating states according to obtained information obtained by the data determination apparatus;

store a history of the obtained information as an obtained information history;

hold an operating state of the data determination apparatus based on the state transition model;

store, as a communication permission list, communication permitted data whose communications are permitted in the respective operating states of the plurality of operating states;

obtain communication data as communication determination data; and obtain the communication determination data obtained, obtain the operating state of the data determination apparatus held as a current operating state, and determine whether or not the communication determination data is communication permitted data whose communication has been permitted in the current operating state, using the current operating state and the communication permission list, wherein the obtained information includes the communication data obtained by the communication, an operation signal indicating receipt of an operation on the data determination apparatus, and a timer signal output from the timer, the processing circuitry generates the state transition model and the communication permission list, based on the obtained information history, the processing circuitry generates the state transition model by setting a wait state when a period of time elapsed between successive communication data included in the Obtained information history is a first period or more, setting, as a first change point, a point of time of having obtained information other than the communication data and setting each of states before and after the first change point as a first operating state, and setting, as a second change point, a point of time of having obtained transition communication data whereby an operating state transition has been determined to be made in each first operating state and setting each of states before and after the second change point as a second operating state.

2. The data determination apparatus according to claim 1, wherein the processing circuitry outputs an alarm indicating detection of abnormality when the communication determination data is determined not to be the communication permitted data.

3. The data determination apparatus according to claim 1, wherein the processing circuitry blocks the communication when the communication determination data is determined not to be the communication permitted data.

4. The data determination apparatus according to claim 1, wherein the processing circuitry transitions the operating state of the data determination apparatus based on the state transition model when the communication determination data is determined to be the communication permitted data.

5. The data determination apparatus according to claim 1, wherein the processing circuitry transitions the operating state of the data determination apparatus to an abnormal state when the communication determination data is determined not to be the communication permitted data.

6. The data determination apparatus according to claim 1, wherein the processing circuitry sets, in the communication permission list, the communication data communicated in each operating state included in the state transition model, as the communication permitted data.

7. The data determination apparatus according to claim 1, wherein the processing circuitry extracts the transition communication data, using a clustering method.

8. A data determination method comprising:

measuring a period of time during which an operating state of a data determination apparatus continues;

storing a state transition model representing a state transition between respective operating states of a plurality of operating states according to obtained information obtained by the data determination apparatus;

storing a history of the obtained information as an obtained information history;

holding an operating state of the data determination apparatus based on the state transition model;

storing, as a communication permission list, communication permitted data whose communications are permitted in the respective operating states of the plurality of operating states;

obtaining communication data as communication determination data; and obtaining the communication determination data obtained, obtaining the operating state of the data determination apparatus held as a current operating state, and determining whether or not the communication determination data is communication permitted data whose communication has been permitted in the current operating state, using the current operating state and the communication permission list, wherein the obtained information includes the communication data obtained by the communication, an operation signal indicating receipt of an operation on the data determination apparatus, and a timer signal output from the timer, the state transition model and the communication permission list are generated based on the obtained information history, the state transition model is generated by setting a wait state when a period of time elapsed between successive communication data included in the obtained information history is a first period or more, setting, as a first change point, a point of time of having obtained information other than the communication data and setting each of states before and after the first change point as a first operating state, and setting, as a second change point, a point of time of having obtained transition communication data whereby an operating state transition has been determined to be made in each first operating state and setting each of states before and after the second change point as a second operating state.

9. A non-transitory computer readable medium storing a program of a data determination apparatus comprising a state transition model storage unit to store a state transition model representing a state transition between respective operating states of a plurality of operating states, and a communication permission list storage unit to store, as a communication permission list, communication permitted data whose communications are permitted in the respective operating states of the plurality of operating states, the program causing a computer to:

measure a period of time during which an operating state of a data determination apparatus continues;

store a state transition model representing a state transition between respective operating states of a plurality of operating states according to obtained information obtained by the data determination apparatus;

store a history of the obtained information as an obtained information history;

hold an operating state of the data determination apparatus based on the state transition model;

store, as a communication permission list, communication permitted data whose communications are permitted in the respective operating states of the plurality of operating states;

obtain communication data as communication determination data; and obtain the communication determination data obtained in the communication process, obtaining the operating state of the data determination apparatus held in the state management process as a current operating state, and determining whether or not the communication determination data is communication permitted data whose communication has been permitted in the current operating state, using the current operating state and the communication permission list, wherein the obtained information includes the communication data obtained by the communication, an operation signal indicating receipt of an operation on the data determination apparatus, and a timer signal output from the timer, the state transition model and the communication permission list are generated based on the obtained information history, the state transition model is generated by setting a wait state when a period of time elapsed between successive communication data included in the obtained information history is a first period or more, setting, as a first change point, a point of time of having obtained information other than the communication data and setting each of states before and after the first change point as a first operating state, and setting, as a second change point, a point of time of having obtained transition communication data whereby an operating state transition has been determined to be made in each first operating state and setting each of states before and after the second change point as a second operating state.

10. A data determination apparatus comprising:

processing circuitry configured to measure a period of time during which an operating state of a data determination apparatus continues;

store a state transition model representing a state transition between respective operating states of a plurality of operating states according to obtained information obtained by the data determination apparatus;

store a history of the obtained information as an obtained information history;

hold an operating state of the data determination apparatus based on the state transition model;

store, as a communication permission list, communication permission rules including communication permitted data whose communications are permitted in the respective operating states of the plurality of operating states, a permission condition under which communication of each communication permitted data is permitted, and a permission process when the communication of the communication permitted data is permitted;

obtain communication data as communication determination data; and obtain the communication determination data obtained, a current operating state being the operating state of the data determination apparatus held, and a timer value being a current value, and determine whether or not the communication determination data satisfies a communication permission rule that permits the communication in the current operating state, using the current operating state, the communication permission list, and the timer value, wherein the obtained information includes the communication data obtained by the communication, an operation signal indicating receipt of an operation on the data determination apparatus, and a timer signal output from the timer, the processing circuitry generates the state transition model and the communication permission list, based on the obtained information history, the processing circuitry generates the state transition model by setting a wait state when a period of time elapsed between successive communication data included in the obtained information history is a first period or more, setting, as a first change point, a point of time of having obtained information other than the communication data and setting each of states before and after the first change point as a first operating state, and setting, as a second change point, a point of time of having obtained transition communication data whereby an operating state transition has been determined to be made in each first operating state and setting each of states before and after the second change point as a second operating state.

11. The data determination apparatus according to claim 10, wherein the processing circuitry stores, as the permission condition, a timer permitted value indicating a value range to permit the communication of the communication permitted data, and stores, as the permission process, a timer set value to be set when the communication of the communication permitted data is permitted; and wherein the processing circuitry determines whether or not the communication determination data satisfies the communication permission rule, using a determination result indicating whether or not the timer value is within the range of the timer permitted value.

12. The data determination apparatus according to claim 10, wherein the processing circuitry:

manages each flag; and obtains the current operating state, the communication permission list, the timer value, and a flag value being a current value of the flag, and determines whether or not the communication determination data satisfies the communication permission rule that permits the communication in the current operating state, using the current operating state, the communication permission list, the timer value, and the flag value.

13. The data determination apparatus according to claim 12, wherein the processing circuitry further stores, as the permission condition, a flag permitted value being a value of the flag to permit the communication of the communication permitted data, and further stores, as the permission process, a flag set value to be set in the flag when the communication of the communication permitted data is permitted; and wherein the processing circuitry determines whether or not the communication determination data satisfies the communication permission rule, using a determination result indicating whether or not the flag value is the flag permitted value.

14. The data determination apparatus according to claim 10, wherein the processing circuitry outputs an alarm indicating detection of abnormality when the communication determination data is determined not to satisfy the communication permission rule.

15. The data determination apparatus according to claim 10, wherein the processing circuitry blocks the communication when the communication determination data is determined not to satisfy the communication permission rule.

16. The data determination apparatus according to claim 10, wherein the processing circuitry transitions the operating state of the data determination apparatus based on the state transition model when the communication determination data is determined to satisfy the communication permission rule.

17. A data determination method comprising:
measuring a period of time during which an operating state of a data determination apparatus continues;
storing a state transition model representing a state transition between respective operating states of a plurality of operating states according to obtained information obtained by the data determination apparatus;
storing a history of the obtained information as an obtained information history;
holding an operating state of the data determination apparatus based on the state transition model;
storing, as a communication permission list, communication permitted data whose communications are permitted in the respective operating states of the plurality of operating states;
obtaining communication data as communication determination data; and
obtaining the communication determination data obtained, a current operating state being the operating state of the data determination apparatus held, and a timer value being a current value, and determining whether or not the communication determination data satisfies a communication permission rule that permits the communication in the current operating state, using the current operating state, the communication permission list, and the timer value, wherein
the obtained information includes the communication data obtained by the communication, an operation signal indicating receipt of an operation on the data determination apparatus, and a timer signal output from the timer,
the state transition model and the communication permission list are generated based on the obtained information history,
the state transition model is generated by setting a wait state when a period of time elapsed between successive communication data included in the obtained information history is a first period or more, setting, as a first change point, a point of time of having obtained information other than the communication data and setting each of states before and after the first change point as a first operating state, and setting, as a second change point, a point of time of having obtained transition communication data whereby an operating state transition has been determined to be made in each first operating state and setting each of states before and after the second change point as a second operating state.

18. A non-transitory computer readable medium storing a program of a data determination apparatus comprising a state transition model storage unit to store a state transition model representing a state transition between respective operating states of a plurality of operating states and a communication permission list storage unit to store, as a communication permission list, communication permission rules including communication permitted data whose communications are permitted in the respective operating states of the plurality of operating states, a permission condition under which communication of each communication permitted data is permitted, and a permission process when the communication of the communication permitted data is permitted, the program causing a computer to:
measure a period of time during which an operating state of a data determination apparatus continues;
store a state transition model representing a state transition between respective operating states of a plurality of operating states according to obtained information obtained by the data determination apparatus;
store a history of the obtained information as an obtained information history;
hold an operating state of the data determination apparatus based on the state transition model;
store, as a communication permission list, communication permitted data whose communications are permitted in the respective operating states of the plurality of operating states;
obtain communication data as communication determination data; and
obtain the communication determination data obtained in the communication process, a current operating state being the operating state of the data determination apparatus held in the state management process, and a timer value being a current value of a timer unit to measure a period of time, and determining whether or not the communication determination data satisfies a communication permission rule that permits the communication in the current operating state, using the current operating state, the communication permission list, and the timer value, wherein
the obtained information includes the communication data obtained by the communication, an operation signal indicating receipt of an operation on the data determination apparatus, and a timer signal output from the timer,
the state transition model and the communication permission list are generated based on the obtained information history,
the state transition model is generated by setting a wait state when a period of time elapsed between successive communication data included in the obtained information history is a first period or more, setting, as a first change point, a point of time of having obtained information other than the communication data and setting each of states before and after the first change point as a first operating state, and setting, as a second change point, a point of time of having obtained transition communication data whereby an operating state transition has been determined to be made in each first operating state and setting each of states before and after the second change point as a second operating state.

* * * * *